United States Patent
Zhang et al.

(10) Patent No.: US 10,889,672 B2
(45) Date of Patent: Jan. 12, 2021

(54) PREPOLYMERIZED RESIN AND USE THEREOF

(71) Applicant: Elite Electronic Material (Kunshan) Co., Ltd., Kunshan (CN)

(72) Inventors: Yan Zhang, Kunshan (CN); Rongtao Wang, Kunshan (CN); Mingsheng Yuan, Kunshan (CN); Jue Tan, Kunshan (CN)

(73) Assignee: Elite Electronic Material (Kunshan) Co., Ltd., Kunshan (CN)

( * ) Notice: Subject to any disclaimer, the term of this patent is extended or adjusted under 35 U.S.C. 154(b) by 145 days.

(21) Appl. No.: 16/211,818

(22) Filed: Dec. 6, 2018

(65) Prior Publication Data
US 2020/0087432 A1    Mar. 19, 2020

(30) Foreign Application Priority Data
Sep. 19, 2018 (CN) .......................... 2018 1 1091850

(51) Int. Cl.
| | |
|---|---|
| C08L 71/12 | (2006.01) |
| C08G 65/42 | (2006.01) |
| C08L 25/16 | (2006.01) |
| C08F 212/12 | (2006.01) |
| C08F 261/06 | (2006.01) |
| C08G 65/48 | (2006.01) |
| C08F 2/38 | (2006.01) |
| C08K 5/13 | (2006.01) |
| C08K 5/37 | (2006.01) |
| C08K 5/14 | (2006.01) |
| C08F 220/18 | (2006.01) |
| C08F 22/40 | (2006.01) |
| C08F 12/36 | (2006.01) |

(52) U.S. Cl.
CPC .............. *C08F 212/12* (2013.01); *C08F 2/38* (2013.01); *C08F 261/06* (2013.01); *C08G 65/485* (2013.01); *C08K 5/13* (2013.01); *C08K 5/14* (2013.01); *C08K 5/37* (2013.01); *C08F 12/36* (2013.01); *C08F 22/40* (2013.01); *C08F 220/18* (2013.01); *C08F 2500/02* (2013.01); *C08G 65/42* (2013.01); *C08G 2650/36* (2013.01); *C08L 25/16* (2013.01); *C08L 71/12* (2013.01)

(58) Field of Classification Search
CPC ......... C08L 71/12; C08L 25/16; C08G 65/40; C08G 65/42; C08F 212/12
See application file for complete search history.

(56) References Cited

U.S. PATENT DOCUMENTS

| | | | | |
|---|---|---|---|---|
| 5,218,050 A | * | 6/1993 | Fischer | C08L 33/06 525/132 |
| 6,352,782 B2 | * | 3/2002 | Yeager | C08G 65/485 428/457 |
| 9,051,465 B1 | * | 6/2015 | Almen | B32B 5/022 |
| 9,243,164 B1 | * | 1/2016 | Almen | C08K 5/03 |
| 10,167,389 B2 | * | 1/2019 | Lin | C08G 65/485 |
| 2013/0266779 A1 | * | 10/2013 | Tokiwa | C08L 71/126 428/195.1 |
| 2015/0313012 A1 | * | 10/2015 | Chen | H05K 1/0373 442/117 |
| 2016/0297941 A1 | * | 10/2016 | Lai | H01Q 1/422 |

FOREIGN PATENT DOCUMENTS

CN        106280387 A  *  1/2017  ............. B32B 15/00

OTHER PUBLICATIONS

CN 106280387 A (Jan. 4, 2017); machine translation. (Year: 2017).*
Peters et al. ANTEC 2010. Proceedings of the 68th Annual Technical Conference & Exhibition, Society of Plastics Engineers, 1858-1861 (May 31, 2011) (Year: 2011).*

* cited by examiner

*Primary Examiner* — Rip A Lee
(74) *Attorney, Agent, or Firm* — Muncy, Geissler, Olds & Lowe, P.C.

(57) ABSTRACT

A prepolymerized resin and a method of preparing the prepolymerized resin are provided, the method comprising a step of prepolymerizing t-butyl styrene and unsaturated bond-containing polyphenylene oxide. The unsaturated bond-containing polyphenylene oxide comprises: methacrylate-terminated polyphenylene oxide, vinylbenzyl-terminated polyphenylene oxide, vinylbenzyl-modified bisphenol A polyphenylene oxide resin, vinyl-containing chain-extended polyphenylene oxide resin or a combination thereof. A resin composition comprising the prepolymerized resin and an article made from the resin composition are also provided.

25 Claims, 8 Drawing Sheets

PREPOLYMERIZED RESIN AND USE THEREOF

CROSS-REFERENCE TO RELATED APPLICATION

This application claims the priority benefits of China Patent Application No. 201811091850.1, filed on Sep. 19, 2018, the entirety of which is hereby incorporated by reference herein and made as a part of this specification.

BACKGROUND

1. Field of the Disclosure

Disclosed is a prepolymerized resin, a preparation method thereof, a resin composition comprising the prepolymerized resin, and an article made therefrom.

2. Description of Related Art

Conventionally, polyphenylene oxide resins are widely used for making low dielectric copper-clad laminates, but copper-clad laminates made solely from a polyphenylene oxide resin has a low glass transition temperature, and polyphenylene oxide resin has poor compatibility with other resins, which causes the problems of high ratio of thermal expansion and poor thermal resistance, thereby failing to meet the demands of new generation high frequency and low dielectric printed circuit boards. Bismaleimide may be introduced to improve the polyphenylene oxide resin to achieve low ratio of thermal expansion and high thermal resistance of the resin system, but this will result in deterioration of the dielectric properties.

Accordingly, there is a need in this field to develop a material for copper-clad laminates that have low ratio of thermal expansion, high thermal resistance and desirable dielectric properties.

SUMMARY

To overcome the problems of poor thermal resistance, high ratio of thermal expansion and poor dielectric properties of polyphenylene oxide resin materials, the present disclosure provides a prepolymerized resin prepared from a prepolymerization reaction of a composition at least comprising (1) t-butyl styrene and (2) unsaturated bond-containing polyphenylene oxide, and a resin composition comprising the prepolymerized resin and an additive. Articles made from the resin composition have advantages including better thermal resistance, better dimensional stability, better dielectric properties, etc.

Particularly, the present disclosure provides a prepolymerized resin prepared from a prepolymerization reaction of a composition, the composition at least comprising: (1) t-butyl styrene; and (2) unsaturated bond-containing polyphenylene oxide.

In one or more embodiments, the prepolymerized resin contains a reactive vinyl group. Unless otherwise specified, "vinyl" or "vinyl group" described herein refers to a reactive vinyl group.

In one or more embodiments, the t-butyl styrene comprises: o-t-butyl styrene (i.e., ortho-t-butyl styrene), m-t-butyl styrene (i.e., meta-t-butyl styrene), p-t-butyl styrene (i.e., para-t-butyl styrene) or a combination thereof.

In one or more embodiments, the t-butyl styrene comprises a t-butyl styrene monomer, a t-butyl styrene oligomer or a combination thereof.

In one or more embodiments, the t-butyl styrene oligomer comprises a t-butyl styrene homopolymer with a weight-average molecular weight of less than or equal to 1000.

In one or more embodiments, the unsaturated bond-containing polyphenylene oxide has a structure shown below:

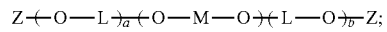

wherein a and b are individually a positive integer of 1 to 30;

—(O-M-O)— represents:

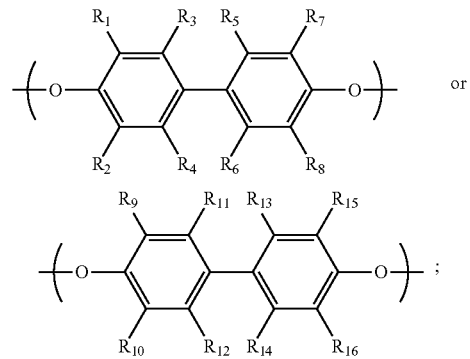

L represents:

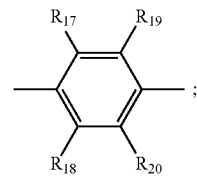

wherein $R_1$, $R_2$, $R_7$ and $R_8$ are the same or different and are individually a halogen atom, a C1-C6 alkyl group or a phenyl group;

$R_3$, $R_4$, $R_5$ and $R_6$ are the same or different and are individually a hydrogen atom, a halogen atom, a C1-C6 alkyl group or a phenyl group;

$R_9$, $R_{10}$, $R_{11}$, $R_{12}$, $R_{13}$, $R_{14}$, $R_{15}$ and $R_{16}$ are the same or different and are individually a halogen atom, a C1-C6 alkyl group, a phenyl group or a hydrogen atom;

A is a C1-C20 straight chain hydrocarbyl group, a C1-C20 branched chain hydrocarbyl group or a C3-C20 cyclic hydrocarbyl group;

$R_{17}$, $R_{18}$, $R_{19}$ and $R_{20}$ are the same or different and are individually a hydrogen atom, a halogen atom, a C1-C6 alkyl group or a phenyl group;

Z has a structure as shown below:

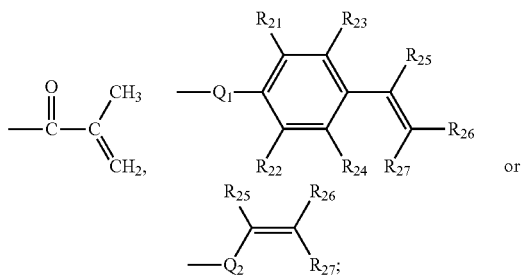

wherein $R_{26}$ and $R_{27}$ are both a hydrogen atom, $R_{21}$, $R_{22}$, $R_{23}$, $R_{24}$ and $R_{25}$ are the same or different and are individually a hydrogen atom, a halogen atom, an alkyl group or a haloalkyl group, wherein the alkyl group or the haloalkyl group are preferably a C1-C6 alkyl group or a halogen-substituted C1-C6 alkyl group respectively;

$Q_1$ and $Q_2$ are individually an organic group with at least one carbon atom, wherein the organic group optionally comprises one or more of a hydrogen atom, an oxygen atom, a nitrogen atom, a sulfur atom and a halogen atom.

In one or more embodiments, A is a C1-C20 straight chain hydrocarbyl group, a C1-C6 branched chain hydrocarbyl group or a C3-C20 cyclic hydrocarbyl group.

In one or more embodiments, the unsaturated bond-containing polyphenylene oxide comprises: methacrylate-terminated polyphenylene oxide, vinylbenzyl-terminated polyphenylene oxide, vinylbenzyl-modified bisphenol A polyphenylene oxide resin, vinyl-containing chain-extended polyphenylene oxide resin or a combination thereof.

In one or more embodiments, the composition further comprises a vinyl-containing compound which comprises one or more carbon-carbon double bonds per molecule.

In one or more embodiments, the vinyl-containing compound comprises: maleimide resin and/or a modification thereof, polyolefin and/or a modification thereof, acrylate and/or a modification thereof, styrene and/or a modification thereof, divinylbenzene and/or a modification thereof, bis(vinylbenzyl)ether and/or a modification thereof, bis(vinylphenyl)ethane and/or a modification thereof, triallyl isocyanurate and/or a modification thereof, triallyl cyanurate and/or a modification thereof, 1,2,4-trivinyl cyclohexane and/or a modification thereof or a combination thereof.

In one or more embodiments, the modifications described above may comprise, but not limited to, a product derived from a vinyl-containing compound with its reactive functional group modified, a product from a prepolymerization reaction of a vinyl-containing compound and other compound(s), a product from a crosslinking reaction of a vinyl-containing compound and other compound(s), a product from a homopolymerized vinyl-containing compound, a product of a copolymerized vinyl-containing compound, etc. For example, a modification of a maleimide resin may comprise a product formed by crosslinking a maleimide resin and a diallyl bisphenol A resin, a product formed by crosslinking a maleimide resin and a vinyl siloxane resin, a polymer of a maleimide resin and a cyanate ester resin or a product formed by crosslinking a maleimide resin and a diamine compound.

In one or more embodiments, the prepolymerized resin is prepared from the prepolymerization reaction of the composition in the presence of an initiator.

In one or more embodiments, the initiator comprises: benzoyl peroxide, dicumyl peroxide, 2,5-dimethyl-2,5-di(t-butylperoxy)hexane, 2,5-dimethyl-2,5-di(t-butylperoxy)-3-hexyne, di-t-butyl peroxide, di(t-butylperoxyisopropyl)benzene, di(t-butylperoxy)phthalate, t-butyl peroxybenzoate, 2,2-di(t-butylperoxy)butane, 2,2-di(t-butylperoxy)octane, 2,5-dimethyl-2,5-di(benzoylperoxy)hexane, 2,3-bis(trimethylsiloxyperoxy)-2,3-diphenylbutane or a combination thereof.

In one or more embodiments, the prepolymerized resin is prepared from the prepolymerization reaction of the composition in the presence of a molecular weight regulator.

In one or more embodiments, the prepolymerized resin is prepared from the prepolymerization reaction of the composition in the presence of an initiator and a molecular weight regulator.

In one or more embodiments, the molecular weight regulator comprises: n-butyl mercaptan, dodecyl mercaptan, mercaptoacetic acid, mercaptopropanoic acid, mercaptoethanol, 2,4-diphenyl-4-methyl-1-pentene, 4,4'-butylidenebis(6-t-butyl-3-methylphenol), 2,2'-methylenebis(4-ethyl-6-t-butylphenol) or a combination thereof.

In one or more embodiments, the prepolymerized resin has a weight-average molecular weight of between 1,000 and 20,000.

The present disclosure further provides a method of preparing a prepolymerized resin, comprising subjecting a composition to a prepolymerization reaction, the composition at least comprising: (1) t-butyl styrene and (2) unsaturated bond-containing polyphenylene oxide.

In one or more embodiments, the method of preparing a prepolymerized resin comprises subjecting a composition to a prepolymerization reaction in the presence of an initiator, the composition at least comprising: (1) t-butyl styrene and (2) unsaturated bond-containing polyphenylene oxide.

In one or more embodiments, the method of preparing a prepolymerized resin comprises subjecting a composition to a prepolymerization reaction in the presence of a molecular weight regulator, the composition at least comprising: (1) t-butyl styrene and (2) unsaturated bond-containing polyphenylene oxide.

In one or more embodiments, the method of preparing a prepolymerized resin comprises subjecting a composition to a prepolymerization reaction in the presence of an initiator and a molecular weight regulator, the composition at least comprising: (1) t-butyl styrene and (2) unsaturated bond-containing polyphenylene oxide.

In one or more embodiments, the composition further comprises a vinyl-containing compound which comprises one or more carbon-carbon double bonds per molecule.

In one or more embodiments, the vinyl-containing compound comprises: maleimide resin and/or a modification thereof, polyolefin and/or a modification thereof, acrylate and/or a modification thereof, styrene and/or a modification thereof, divinylbenzene and/or a modification thereof, bis(vinylbenzyl)ether and/or a modification thereof, bis(vinylphenyl)ethane and/or a modification thereof, triallyl isocyanurate and/or a modification thereof, triallyl cyanurate and/or a modification thereof, 1,2,4-trivinyl cyclohexane and/or a modification thereof or a combination thereof.

In one or more embodiments, the initiator comprises: benzoyl peroxide, dicumyl peroxide, 2,5-dimethyl-2,5-di(t-butylperoxy)hexane, 2,5-dimethyl-2,5-di(t-butylperoxy)-3-hexyne, di-t-butyl peroxide, di(t-butylperoxyisopropyl)benzene, di(t-butylperoxy)phthalate, t-butyl peroxybenzoate, 2,2-di(t-butylperoxy)butane, 2,2-di(t-butylperoxy)octane, 2,5-dimethyl-2,5-di(benzoylperoxy)hexane, 2,3-bis(trimethylsiloxyperoxy)-2,3-diphenylbutane or a combination thereof.

According to the present disclosure, the initiator is preferably benzoyl peroxide, dicumyl peroxide or a combination thereof.

In one or more embodiments, the molecular weight regulator comprises: n-butyl mercaptan, dodecyl mercaptan, mercaptoacetic acid, mercaptopropanoic acid, mercaptoethanol, 2,4-diphenyl-4-methyl-1-pentene, 4,4'-butylidenebis(6-t-butyl-3-methylphenol), 2,2'-methylenebis(4-ethyl-6-t-butylphenol) or a combination thereof.

According to the present disclosure, the molecular weight regulator is preferably n-butyl mercaptan, 2,4-diphenyl-4-methyl-1-pentene or a combination thereof.

In one or more embodiments, a conversion rate of the t-butyl styrene is between 30% and 99%, preferably 50%-95%, more preferably 50%-90%, and even more preferably 75%-90%.

The present disclosure further provides a resin composition comprising the aforesaid prepolymerized resin and an additive.

In one or more embodiments, the resin composition comprises 1 to 300 parts by weight of the additive relative to 100 parts by weight of the prepolymerized resin.

In one or more embodiments, the additive comprises: polyphenylene oxide and/or a modification thereof, cyanate ester and/or a modification thereof, maleimide resin and/or a modification thereof, polyolefin and/or a modification thereof, acrylate and/or a modification thereof, styrene and/or a modification thereof, divinylbenzene and/or a modification thereof, bis(vinylbenzyl)ether and/or a modification thereof, bis(vinylphenyl)ethane and/or a modification thereof, triallyl isocyanurate and/or a modification thereof, triallyl cyanurate and/or a modification thereof, 1,2,4-trivinyl cyclohexane and/or a modification thereof or a combination thereof.

In one or more embodiments, the resin composition may further optionally comprise: epoxy resin and/or a modification thereof, phenolic resin and/or a modification thereof, benzoxazine resin and/or a modification thereof, maleic anhydride and/or a modification thereof, acrylic acid and/or a modification thereof, polyester and/or a modification thereof, amine curing agent and/or a modification thereof, diallyl bisphenol A and/or a modification thereof, polyamide and/or a modification thereof, polyimide and/or a modification thereof or a combination thereof.

In one or more embodiments, the resin composition may further comprise flame retardant, inorganic filler, curing accelerator, solvent, toughening agent, silane coupling agent or a combination thereof.

The present disclosure also provides an article made from the aforesaid resin composition.

In one or more embodiments, the article comprises a resin film, a prepreg, a laminate or a printed circuit board.

In one or more embodiments, the article has at least one of the following properties:

a glass transition temperature as measured by reference to IPC-TM-650 2.4.24.5 of greater than or equal to 200° C.;

as measured by reference to JIS C2565, a dissipation factor of less than or equal to 0.004 and a dielectric constant of less than or equal to 3.5;

a peel strength as measured by reference to IPC-TM-650 2.4.8 of greater than or equal to 3.0 lb/in;

a Z-axis ratio of thermal expansion as measured by reference to IPC-TM-650 2.4.24.5 of less than or equal to 1.75%; and no delamination occurs after moisture absorption of 5 hours as measured by reference to IPC-TM-650 2.6.16.1 and then by reference to IPC-TM-650 2.4.23.

DETAILED DESCRIPTION OF EMBODIMENTS

Figure 1:
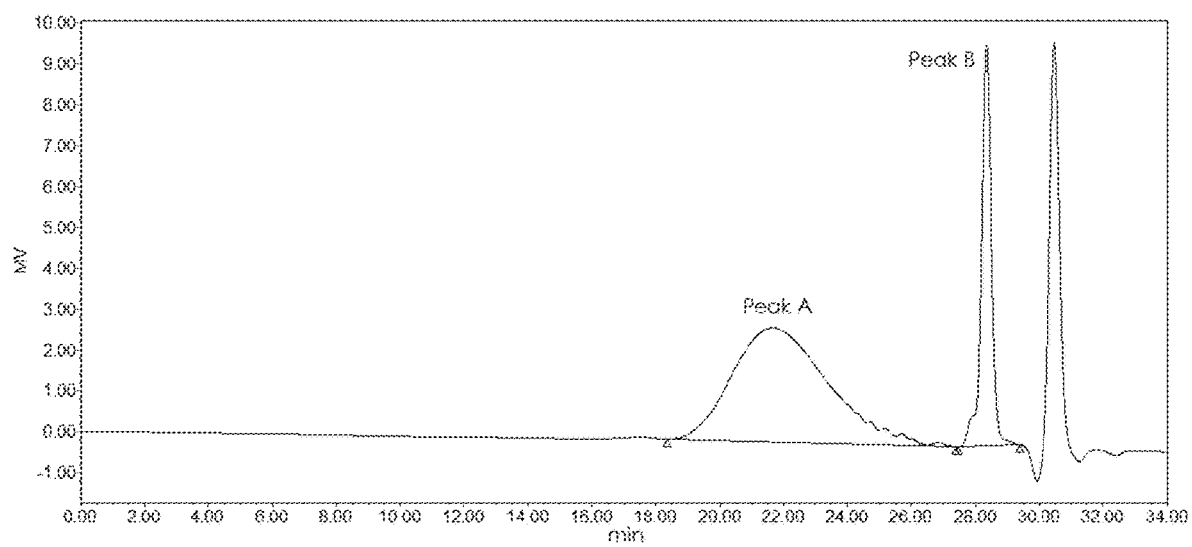
FIG. 1 illustrates the GPC spectrum of the resin in Preparation Example 1 before prepolymerization.

To enable those skilled in the art to further appreciate the features and effects of the present disclosure, words and terms contained in the specification and appended claims are described and defined. Unless otherwise defined, all technical and scientific terms used herein have the same meaning as commonly understood by those of ordinary skill in the art to which this disclosure pertains. In the case of conflict, the present document and definitions contained herein will control.

While some theories or mechanisms may be proposed herein, the present disclosure is not bound by any theories or mechanisms described regardless of whether they are right or wrong, as long as the embodiments can be implemented according to the present disclosure.

As used herein, "a," "an" or similar expression is employed to describe components and features of the present disclosure. This is done merely for convenience and to give a general sense of the scope of the present disclosure. Accordingly, this description should be read to include one or at least one and the singular also includes the plural unless it is obvious to mean otherwise.

As used herein, the term "comprises," "comprising," "includes," "including," "has," "having" or any other variant thereof is construed as an open-ended transitional phrase intended to cover a non-exclusive inclusion. For example, a composition or article of manufacture that comprises a list of elements is not necessarily limited to only those elements but may include other elements not expressly listed or inherent to such composition or article of manufacture. Further, unless expressly stated to the contrary, the term "or" refers to an inclusive or and not to an exclusive or. For example, a condition "A or B" is satisfied by any one of the following: A is true (or present) and B is false (or not present), A is false (or not present) and B is true (or present), and both A and B are true (or present). In addition, whenever open-ended transitional phrases are used, such as "comprises," "comprising," "includes," "including," "has," "having" or any other variant thereof, it is understood that transitional phrases such as "consisting essentially of" and "consisting of" are also disclosed and included.

In this disclosure, features such as values, numbers, contents, amounts or concentrations presented as a numerical range or a percentage range are merely for convenience and brevity. Therefore, a numerical range or a percentage range should be interpreted as encompassing and specifically disclosing all possible subranges and individual numerals or values therein, including integers and fractions, particularly all integers therein. For example, a range of "1 to 8" or "between 1 and 8" should be understood as explicitly disclosing all subranges such as 1 to 7, 2 to 8, 2 to 6, 3 to 6, 4 to 8, 3 to 8 and so on, particularly subranges defined by integers, as well as disclosing all individual values such as 1, 2, 3, 4, 5, 6, 7 and 8. Unless otherwise defined, the aforesaid interpretation rule should be applied throughout the present disclosure regardless broadness of the scope.

Whenever amount, concentration or other numeral or parameter is expressed as a range, a preferred range or a series of upper and lower limits, it is understood that all ranges defined by any pair of the upper limit or preferred value and the lower limit or preferred value are specifically disclosed, regardless whether these ranges are explicitly described or not. In addition, unless otherwise defined, whenever a range is mentioned, the range should be interpreted as inclusive of the endpoints and every integers and fractions in the range.

Given the intended purposes and advantages of this disclosure are achieved, numerals or figures have the precision of their significant digits. For example, 40.0 should be understood as covering a range of 39.50 to 40.49.

As used herein, a Markush group or a list of items is used to describe examples or embodiments of the present disclosure. A skilled artisan will appreciate that all subgroups of members or items and individual members or items of the Markush group or list can also be used to describe the present disclosure. For example, when X is described as being "selected from a group consisting of $X_1$, $X_2$ and $X_3$," it is intended to disclose the situations of X is $X_1$ and X is $X_1$ and/or $X_2$ and/or $X_3$. In addition, when a Markush group or a list of items is used to describe examples or embodiments of the present disclosure, a skilled artisan will understand that any subgroup or any combination of the members or items in the Markush group or list may also be used to describe the present disclosure. Therefore, when X is described as being "selected from a group consisting of $X_1$, $X_2$ and $X_3$" and Y is described as being "selected from a group consisting of $Y_1$, $Y_2$ and $Y_3$," the disclosure encompasses any combination of X is $X_1$ and/or $X_2$ and/or $X_3$ and Y is $Y_1$ and/or $Y_2$ and/or $Y_3$.

It should be understood that all features disclosed herein may be combined in any way to constitute the solution of the present disclosure, as long as there is no conflict present in the combination of these features.

Examples and embodiments are described in detail below. It will be understood that these examples and embodiments are exemplary only and are not intended to limit the scope of the present disclosure. Unless otherwise specified, processes, reagents and conditions described in the examples are those known in the art.

A main feature of the present disclosure is to use proper conditions, such as in the presence of an initiator and a molecular weight regulator, to proceed a prepolymerization reaction of t-butyl styrene and unsaturated bond-containing polyphenylene oxide, so as to control the conversion rate and molecular weight of a prepolymerized resin. In comparison with the use of t-butyl styrene and unsaturated bond-containing polyphenylene oxide which are not subject to prepolymerization, or the use of a prepolymerized resin of unsaturated bond-containing polyphenylene oxide and trial-lyl isocyanurate (TAIC), inventors of the present disclosure have found that the prepolymerized resin formed by prepolymerizing t-butyl styrene and unsaturated bond-containing polyphenylene oxide may provide the following desirable effects: the prepolymerized resin of the present disclosure still contains a vinyl group after prepolymerization and therefore may crosslink with other vinyl-containing compound in the resin composition; the prepolymerized resin of the present disclosure may improve the drawback of high organic volatile content of prepregs due to the low boiling point of non-prepolymerized t-butyl styrene and further improve the laminate property; and copper-clad laminates made from the prepolymerized resin of the present disclosure have one or more of the excellent properties including better thermal resistance, better peel strength, better thermal resistance after moisture absorption and better dielectric properties, lower ratio of thermal expansion, and absence of branch-like pattern formed at the edges of laminates after lamination.

Therefore, the present disclosure provides a prepolymerized resin prepared from a prepolymerization reaction of a composition, the composition at least comprising: (1) t-butyl styrene and (2) unsaturated bond-containing polyphenylene oxide.

Examples of t-butyl styrene suitable for the present disclosure comprise but are not limited to its structural isomers, stereoisomers or a combination thereof, such as o-t-butyl styrene, m-t-butyl styrene, p-t-butyl styrene or a combination thereof, as shown below:

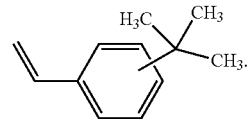

Any one or a mixture of two or more structural isomers of t-butyl styrene may be used. In some embodiments, t-butyl styrene as described herein further comprises an oligomer of the same or different structural isomers of t-butyl styrene. In some embodiments, t-butyl styrene as described herein refers to a mixture of monomer and oligomer of t-butyl styrene.

Commercially available as well as self-prepared t-butyl styrene can both be used. For example, in some embodiments, the present disclosure uses the t-butyl styrene sold by Tokyo Chemical Industry Co., Ltd. In some embodiments, the present disclosure preferably uses p-t-butyl styrene, such as t-butyl styrene with a p-t-butyl styrene content of 50% or more, preferably 60% or more, and more preferably 70% or more. It should be understood that in such case t-butyl styrene may be a mixture containing monomer of different structural isomer and oligomer of different structural isomer. In some embodiments, t-butyl styrene may be a mixture containing monomer of p-t-butyl styrene and oligomer of p-t-butyl styrene. In some embodiments, the present disclosure uses a t-butyl styrene with a p-t-butyl styrene content of 90% or more.

As used herein, the t-butyl styrene oligomer comprises, but not limited to, a t-butyl styrene homopolymer with a weight-average molecular weight of less than or equal to 1000. In some embodiments, the present disclosure preferably uses a t-butyl styrene oligomer containing monomer with a p-t-butyl styrene content of 50% or more, preferably 60% or more, and more preferably 70% or more.

In some embodiments, the present disclosure uses a mixture containing monomer of t-butyl styrene and oligomer of t-butyl styrene. In some embodiments, the content of a p-t-butyl styrene monomer contained in the mixture is greater than or equal to 90%.

Unsaturated bond-containing polyphenylene oxide suitable for the present disclosure is not particularly limited and may comprise any one or more commercially available products, self-prepared products or a combination thereof. Generally, unsaturated bond-containing polyphenylene oxide suitable for the present disclosure has a structure shown below:

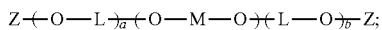

wherein a and b are individually a positive integer of 1 to 30, preferably a positive integer of 1 to 10, and more preferably a positive integer of 1 to 5;

—(O-M-O)— represents:

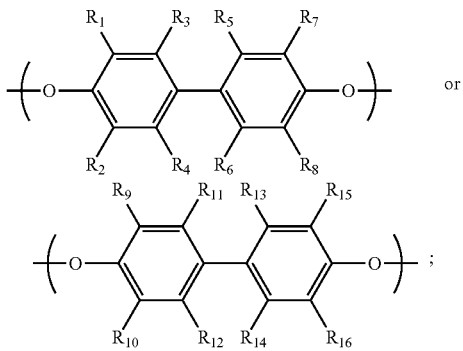

L represents:

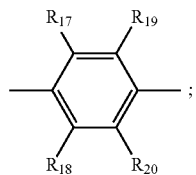

wherein $R_1$, $R_2$, $R_7$ and $R_8$ are the same or different and are individually a halogen atom, a C1-C6 alkyl group or a phenyl group; $R_3$, $R_4$, $R_5$ and $R_6$ are the same or different and are individually a hydrogen atom, a halogen atom, a C1-C6 alkyl group or a phenyl group; in some embodiments, $R_1$, $R_2$, $R_3$, $R_6$, $R_7$ and $R_8$ are individually a methyl group;

$R_9$, $R_{10}$, $R_{11}$, $R_{12}$, $R_{13}$, $R_{14}$, $R_{15}$ and $R_{16}$ are the same or different and are individually a halogen atom, a C1-C6 alkyl group, a phenyl group or a hydrogen atom; in some embodiments, $R_9$, $R_{10}$, $R_{15}$ and $R_{16}$ are individually a methyl group;

A is a C1-C20 straight chain hydrocarbyl group, a C1-C20 branched chain hydrocarbyl group (e.g., alkyl group) or a C3-C20 cyclic hydrocarbyl group (e.g., cycloalkyl group), preferably —CH$_2$— or —C(CH$_3$)$_2$—;

$R_{17}$, $R_{18}$, $R_{19}$ and $R_{20}$ are the same or different and are individually a hydrogen atom, a halogen atom, a C1-C6 alkyl group or a phenyl group;

Z has a structure as shown below:

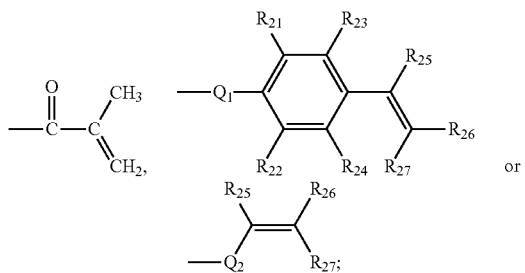

wherein $R_{26}$ and $R_{27}$ are both a hydrogen atom, $R_{21}$, $R_{22}$, $R_{23}$, $R_{24}$ and $R_{25}$ are the same or different and are individually a hydrogen atom, a halogen atom, an alkyl group or a haloalkyl group, wherein the alkyl group or haloalkyl group preferably is a C1-C6 alkyl group or a halogen-substituted C1-C6 alkyl group; $Q_1$ and $Q_2$ are individually an organic group with at least one carbon atom, wherein the organic group optionally comprises one or more of a hydrogen atom, an oxygen atom, a nitrogen atom, a sulfur atom and a halogen atom. In some embodiments, $Q_1$ and $Q_2$ are individually a methylene group (—CH$_2$—). In some embodiments, $R_{21}$ to $R_{25}$ are individually a hydrogen atom or a C1-C6 alkyl group.

Examples of the unsaturated bond-containing polyphenylene oxide include: vinylbenzyl-terminated polyphenylene oxide resin (e.g., OPE-2st available from Mitsubishi Gas Chemical Co., Inc.), methacrylate-terminated polyphenylene oxide resin (e.g., SA-9000 available from SABIC), vinylbenzyl-modified bisphenol A polyphenylene oxide resin, vinyl-containing chain-extended polyphenylene oxide resin or a combination thereof. The vinyl-containing chain-extended polyphenylene oxide resin may include various polyphenylene oxide resins disclosed in the US Patent Application Publication No. 2016/0185904 A1, all of which are incorporated herein by reference in their entirety.

The composition of the present disclosure may further comprise a vinyl-containing compound. The vinyl-containing compound comprises one or more, such as two, three or four, carbon-carbon double bonds per molecule. Generally, the vinyl-containing compound does not comprise t-butyl styrene and vinyl-containing polyphenylene oxide described above. The content of the vinyl-containing compound is not limited.

Examples of the vinyl-containing compound suitable for the present disclosure comprise but are not limited to: maleimide resin and/or a modification thereof, polyolefin and/or a modification thereof, acrylate and/or a modification thereof, styrene and/or a modification thereof, divinylbenzene (DVB) and/or a modification thereof, bis(vinylbenzyl) ether (BVBE) and/or a modification thereof, bis(vinylphenyl)ethane and/or a modification thereof, triallyl isocyanurate (TAIC) and/or a modification thereof, triallyl cyanurate (TAC) and/or a modification thereof, 1,2,4-trivinyl cyclohexane (TVCH) and/or a modification thereof or a combination thereof. In some embodiments, the present disclosure uses the divinylbenzene sold by Nippon Steel & Sumikin Chemical.

Examples of the modification described above may comprise, but not limited to, a product derived from a vinyl-containing compound with its reactive functional group modified, a product from a prepolymerization reaction of a vinyl-containing compound and other compound(s), a product from a crosslinking reaction of a vinyl-containing compound and other compound(s), a product from homopolymerizing a vinyl-containing compound, a product from copolymerizing at least two different vinyl-containing compounds, etc. For example, but not limited thereto, a modification of a maleimide resin may comprise a product formed by crosslinking a maleimide resin and a diallyl bisphenol A resin, a product formed by crosslinking a maleimide resin and a vinyl siloxane resin, a polymer of a maleimide resin and a cyanate ester resin or a product formed by crosslinking a maleimide resin and a diamine compound.

The prepolymerization reaction of the vinyl-containing compound according to the present disclosure refers to a conversion rate of the vinyl-containing compound of between 0% and 100% (exclusive of 0% and 100%). Existence of some unpolymerized (e.g., not converted) vinyl-containing compounds may increase the compatibility and crosslinking degree of the prepolymerized resin in the resin composition. Specifically, a 0% conversion rate of the vinyl-containing compound represents no reaction of the vinyl-containing compound and therefore no product formation from the prepolymerization reaction of the vinyl-containing compound and other compound. Similarly, a 100% conversion rate of the vinyl-containing compound represents complete reaction of the vinyl-containing compound and therefore no product formation from the prepolymerization reaction of the vinyl-containing compound and other compound.

The composition disclosed herein may further comprise an initiator and/or a molecular weight regulator. Any initiator capable of initiating the polymerization reaction of a vinyl-containing monomer or oligomer and an unsaturated bond-containing polyphenylene oxide is suitable for the present disclosure. In some embodiments, examples of the initiator suitable for the present disclosure comprise, but not limited to: benzoyl peroxide, dicumyl peroxide, 2,5-dimethyl-2,5-di(t-butylperoxy)hexane, 2,5-dimethyl-2,5-di(t-butylperoxy)-3-hexyne, di-t-butyl peroxide, di(t-butylperoxyisopropyl)benzene, di(t-butylperoxy)phthalate, t-butyl peroxybenzoate, 2,2-di(t-butylperoxy)butane, 2,2-di(t-butylperoxy)octane, 2,5-dimethyl-2,5-di(benzoylperoxy)hexane, 2,3-bis(trimethylsiloxyperoxy)-2,3-diphenylbutane or a combination thereof. In some embodiments, the present disclosure uses the dicumyl peroxide sold by NOF Corporation. The amount of the initiator may be the conventional amount used in this field. In the present disclosure, generally 0.01 to 5 parts by weight and preferably 0.1 to 1 part by weight of the initiator is used relative to 100 parts by weight of t-butyl styrene and unsaturated bond-containing polyphenylene oxide.

Conventional molecular weight regulators known in the art may be optionally used if needed. For example, the molecular weight regulator suitable for the present disclosure may comprise, but not limited to: n-butyl mercaptan, dodecyl mercaptan, mercaptoacetic acid, mercaptopropanoic acid, mercaptoethanol, 2,4-diphenyl-4-methyl-1-pentene, 4,4'-butylidenebis (6-t-butyl-3-methylphenol), 2,2'-methylenebis(4-ethyl-6-t-butylphenol) or a combination thereof, preferably comprising n-butyl mercaptan, 2,4-diphenyl-4-methyl-1-pentene or a combination thereof. In some embodiments, the present disclosure uses the 2,4-diphenyl-4-methyl-1-pentene sold by TCI (Shanghai) Development Co., Ltd. The amount of the molecular weight regulator may be the conventional amount used in this field. In the present disclosure, generally 0.01 to 5 parts by weight and preferably 0.1 to 1 part by weight of the molecular weight regulator is used relative to 100 parts by weight of t-butyl styrene and unsaturated bond-containing polyphenylene oxide.

The prepolymerized resin of the present disclosure may be obtained from a prepolymerization reaction of t-butyl styrene, unsaturated bond-containing polyphenylene oxide and optional vinyl-containing compound in the presence of an initiator and/or a molecular weight regulator. Generally, t-butyl styrene and unsaturated bond-containing polyphenylene oxide are prepolymerized at a weight ratio of 9.9:0.1 to 0.1:9.9, such as 9:1 to 1:9, 8:2 to 2:8 or 7:3 to 3:7. In some embodiments, the weight ratio of t-butyl styrene and unsaturated bond-containing polyphenylene oxide may for example be 9:1, 8:2, 7:3, 6:4, 5.5:4.5, 5:5, 4.5:5.5, 4:6, 3:7, 2:8 or 1:9, but not limited thereto. For example, the weight ratio of t-butyl styrene and unsaturated bond-containing polyphenylene oxide may also be 7.5:2.5.

According to the present disclosure, the prepolymerized resin has a weight-average molecular weight of between 1,000 and 20,000, preferably between 2,000 and 10,000, and more preferably between 4,000 and 8,000. In some embodiments, the prepolymerized resin has a weight-average molecular weight of between 3,000 and 10,000.

The prepolymerized resin of the present disclosure contains residual reactive vinyl group, and the conversion rate of t-butyl styrene and the molecular weight of the prepolymerized resin are both controlled in a preferred range. As used herein, "reactive vinyl group" refers to a vinyl group present in the resin (e.g., the prepolymerized resin prepared by the present disclosure) which may react (e.g., via polymerization or crosslinking) with other compound (e.g., additive in the resin composition of the present disclosure). In the present disclosure, the presence and content of the reactive vinyl group in the prepolymerized resin is controlled by controlling the conversion rate of t-butyl styrene. For example, the conversion rate of t-butyl styrene may be between 30% and 99%, preferably between 50% and 95%, more preferably between 50% and 90%, and even more preferably between 75% and 90%. If the conversion rate is 0%, which means that t-butyl styrene is not reacted at all, the prepolymerized resin of the present disclosure will not be formed. If the conversion rate is 100%, which means that t-butyl styrene is completely reacted, the prepolymerized resin of the present disclosure will not be formed.

As used herein, the conversion rate of t-butyl styrene can be calculated by dividing the reduced integral area of the characteristic peak of t-butyl styrene under GPC curve after the prepolymerization reaction by the integral area of the characteristic peak of t-butyl styrene in the mixture prior to the prepolymerization reaction.

In some embodiments, the present disclosure also comprises a composition at least comprising the t-butyl styrene and unsaturated bond-containing polyphenylene oxide as described above, and optionally comprising the vinyl-containing compound, initiator and molecular weight regulator as described above. The content and ratio of each component in the composition are as described above. The composition may optionally comprise one or more solvents, such as methyl ethyl ketone and/or toluene.

The prepolymerized resin of the present disclosure may be prepared by the method as follow: subjecting a composition at least comprising (1) the aforesaid t-butyl styrene and (2) the aforesaid unsaturated bond-containing polyphenylene oxide to a prepolymerization reaction under proper conditions. The prepolymerization reaction may be performed in the presence of an initiator and/or a molecular weight regulator. The types of the initiator and the molecular weight regulator are as described above.

The amount of the initiator or the molecular weight regulator suitable for the present disclosure is not particularly limited; relative to a total of 100 parts by weight of t-butyl styrene and unsaturated bond-containing polyphenylene oxide, the initiator or the molecular weight regulator may be individually 0.01 to 5 parts by weight or preferably 0.1 to 1 part by weight.

One of the features of the present disclosure is to, under proper conditions, control the reaction conversion rate of t-butyl styrene and unsaturated bond-containing polyphenylene oxide and the molecular weight of the prepolymerized resin obtained, such as the prepolymerized resin preferably having a weight-average molecular weight of 3000 to 10000, such that the prepolymerized resin thus obtained contains a reactive vinyl group. For example, during the prepolymerization reaction, the molecular weight regulator is used to control the reaction conversion rate of t-butyl styrene and unsaturated bond-containing polyphenylene oxide and the molecular weight of the prepolymerized resin obtained, such that the components are partially reacted and the product may retain residual vinyl group. For example, during the prepolymerization reaction, the conversion rate of t-butyl styrene may be between 30% and 99%, preferably between 50% and 95%, preferably between 50% and 90%, and more preferably between 75% and 90%. Existence of some unpolymerized (e.g., not converted) t-butyl styrene may improve the compatibility and crosslinking degree of the prepolymerized resin in the resin composition. Particularly, if the conversion rate is 0%, which means that t-butyl styrene is not reacted at all, the prepolymerized resin of the present disclosure will not be formed. Similarly, if the conversion rate is 100%, which means that t-butyl styrene is completely reacted, the prepolymerized resin of the present disclosure will not be formed.

In some embodiments, reactants of the prepolymerization reaction may further comprise the aforesaid vinyl-containing compound, and the amount of the vinyl-containing compound is not limited.

Generally, the t-butyl styrene, unsaturated bond-containing polyphenylene oxide and optional initiator and/or molecular weight regulator are dissolved in a solvent to proceed the prepolymerization reaction. Any solvent used in the polymerization reaction of a vinyl-containing monomer or oligomer and an unsaturated bond-containing polyphenylene oxide is suitable for the present disclosure, including but not limited to toluene and/or methyl ethyl ketone. Temperature of the prepolymerization reaction is generally higher than the room temperature, such as between 40 and 140° C., preferably between 70 and 100° C. The reaction time is generally 0.5-6 hours, preferably 1-4 hours. The reaction is generally performed with stirring. Generally, prior to the reaction, the temperature is increased to above the room temperature to react for a while, and then the temperature is reduced to the room temperature (about 25° C.) to obtain a solution, which is filtered to remove impurities and to obtain a purified prepolymerization reaction product, which is the prepolymerized resin formed by the prepolymerization reaction of t-butyl styrene and unsaturated bond-containing polyphenylene oxide. If the reactant contains a vinyl-containing compound, the t-butyl styrene, unsaturated bond-containing polyphenylene oxide and optional initiator and/or molecular weight regulator are dissolved in a solvent, and the vinyl-containing compound is added. If the vinyl-containing compound is in the solid state, stirring will be required to dissolve it. Next, the reaction temperature is increased to above the room temperature, such as 50-130° C., preferably 70-100° C., and the reaction is stirred for 0.5-6 hours, preferably 1-4 hours. Then the temperature is reduced to the room temperature (about 25° C.) to obtain a solution, which is filtered to remove impurities to obtain a purified prepolymerization reaction product, i.e., the prepolymerized resin formed by the prepolymerization reaction of t-butyl styrene, unsaturated bond-containing polyphenylene oxide and vinyl-containing compound.

The resin composition according to the present disclosure comprises the prepolymerized resin of the present disclosure and an additive.

Examples of the additive suitable for the resin composition according to the present disclosure comprise, but not limited to: polyphenylene oxide and/or a modification thereof, cyanate ester and/or a modification thereof, maleimide resin and/or a modification thereof, polyolefin and/or a modification thereof, acrylate and/or a modification thereof, styrene and/or a modification thereof, divinylbenzene and/or a modification thereof, bis(vinylbenzyl)ether and/or a modification thereof, bis(vinylphenyl)ethane and/or a modification thereof, triallyl isocyanurate and/or a modification thereof, triallyl cyanurate and/or a modification thereof, 1,2,4-trivinyl cyclohexane and/or a modification thereof or a combination thereof. The additive is preferably a maleimide resin, a polyolefin and/or a modification thereof. Relative to 100 parts by weight of the prepolymerized resin, individual additives or their combination may be used by an amount of 1 to 300 parts by weight, preferably 5 to 200 parts by weight, more preferably 5 to 80 parts by weight, and even more preferably 15 to 60 parts by weight.

Modifications of additives suitable for the resin composition of the present disclosure refers to compounds with modified properties by physical or chemical means, preferably referring to products derived from additives whose hydrogen atom or group is substituted by other atom or group.

For example, halogen-substituted hydrocarbon, alcohol, aldehyde, and carboxylic acid may be considered as derivatives of hydrocarbon as they are products of hydrocarbon with its hydrogen atom substituted by halogen, hydroxyl group, oxygen, etc.

Additives suitable for the resin composition disclosed herein are described briefly below.

Polyphenylene oxide may comprise vinyl-containing polyphenylene oxide, but not limited thereto. For example, unless otherwise specified, the polyphenylene oxide used in the present disclosure is not particularly limited and may be any commercial product, synthesized product by the Applicant or a combination thereof. Examples of the polyphenylene oxide include: vinylbenzyl-terminated polyphenylene oxide resin (e.g., OPE-2st available from Mitsubishi Gas Chemical Co., Inc.), methacrylate-terminated polyphenylene oxide resin (e.g., SA-9000 available from SABIC), vinylbenzyl-modified bisphenol A polyphenylene oxide resin, vinyl-containing chain-extended polyphenylene oxide resin or a combination thereof. A preferred polyphenylene oxide is the vinyl-containing polyphenylene oxide.

The cyanate ester may include any one or more cyanate ester monomers, oligomers, polymers or a combination thereof suitable for preparing a prepreg, a resin film, a laminate or a printed circuit board, such as a compound having an Ar—O—C≡N structure, wherein Ar may be a substituted or unsubstituted aromatic group. Examples of cyanate ester include but are not limited to novolac cyanate ester resin, bisphenol A cyanate ester resin, bisphenol F cyanate ester resin, dicyclopentadiene-containing cyanate ester resin, naphthalene-containing cyanate ester resin, phenolphthalein cyanate ester resin, adamantane cyanate ester resin, fluorene cyanate ester resin or a combination thereof. The novolac cyanate ester resin may be bisphenol A novolac cyanate ester resin, bisphenol F novolac cyanate ester resin or a combination thereof. For example, the cyanate ester resin may be available from Lonza under the tradename Primaset PT-15, PT-30S, PT-60S, BA-200, BA-230S, BA-3000S, BTP-2500, BTP-6020S, DT-4000, DT-7000, ULL950S, HTL-300, CE-320, LVT-50, and LeCy.

A maleimide resin refers to a compound, a mixture or a combination thereof which contains its monomer, its oligomer, its polymer or a combination thereof which has at least one maleimide group. Unless otherwise specified, the maleimide resin used in the present disclosure is not particularly limited and may include any one or more maleimide resins or a combination thereof suitable for preparing a prepreg, a resin film, a laminate or a printed circuit board. Examples of maleimide resin include but are not limited to 4,4'-diphenylmethane bismaleimide, oligomer of phenylmethane maleimide (a.k.a. polyphenylmethane maleimide), m-phenylene bismaleimide, bisphenol A diphenyl ether bismaleimide, 3,3'-dimethyl-5,5'-diethyl-4,4'-diphenylmethane bismaleimide, 4-methyl-1,3-phenylene bismaleimide, 1,6-bismaleimide-(2,2,4-trimethyl)hexane, N-2,3-xylylmaleimide, N-2,6-xylylmaleimide, N-phenylmaleimide, maleimide compound containing aliphatic long chain structure, prepolymer thereof and a combination thereof. The aforesaid prepolymer may for example be a prepolymer of diallyl compound and maleimide compound, a prepolymer of diamine and maleimide compound, a prepolymer of multifunctional amine and maleimide compound or a prepolymer of acid phenol compound and maleimide compound.

For example, the maleimide resin may include products such as BMI-1000, BMI-1000H, BMI-1100, BMI-1100H, BMI-2000, BMI-2300, BMI-3000, BMI-3000H, BMI-4000, BMI-5000, BMI-5100, BMI-TMH, BMI-7000 and BMI-7000H available from Daiwakasei Co., Ltd., or products such as BMI-70 and BMI-80 available from K.I Chemical Industry Co., Ltd.

For example, the maleimide resin containing aliphatic long chain structure may include products such as BMI-689, BMI-1400, BMI-1500, BMI-1700, BMI-2500, BMI-3000, BMI-5000 and BMI-6000 available from Designer Molecules Inc.

In some embodiments, the amount of the maleimide resin, relative to 100 parts by weight of the prepolymerized resin, may be 10-80 parts by weight, preferably 10-70 parts by weight, and more preferably 20-50 parts by weight.

The acrylate may include, but not limited to, tricyclodecane di(meth)acrylate (e.g., SR833 S, available from Cray Valley), tri(meth)acrylate, 1,1'-[(octahydro-4,7-methano-1H-indene-5,6-diyl)bis(methylene)]ester or a combination thereof.

Examples of polyolefin include but are not limited to styrene-butadiene-divinylbenzene terpolymer, styrene-butadiene-maleic anhydride terpolymer, vinyl-polybutadiene-urethane oligomer, styrene butadiene copolymer, hydrogenated styrene butadiene copolymer, styrene isoprene copolymer, hydrogenated styrene isoprene copolymer, hydrogenated styrene-butadiene-divinylbenzene copolymer, polybutadiene (homopolymer of butadiene), maleic anhydride-butadiene copolymer, methyl styrene copolymer or a combination thereof. In some embodiments, the present disclosure uses the styrene butadiene copolymer available from Cray Valley, e.g., Ricon 100. In some embodiments, the amount of the polyolefin, relative to 100 parts by weight of the prepolymerized resin, may be 5-60 parts by weight, preferably 5-50 parts by weight, and more preferably 10-30 parts by weight.

The resin composition disclosed herein may further optionally comprise: epoxy resin and/or a modification thereof, phenolic resin and/or a modification thereof, benzoxazine resin and/or a modification thereof, maleic anhydride and/or a modification thereof, acrylic acid and/or a modification thereof, polyester and/or a modification thereof, amine curing agent and/or a modification thereof, diallyl bisphenol A and/or a modification thereof, polyamide and/or a modification thereof, polyimide and/or a modification thereof or a combination thereof.

The resin composition of the present disclosure may further comprise flame retardant, inorganic filler, curing accelerator, solvent, toughening agent, silane coupling agent or a combination thereof.

The flame retardant suitable for the present disclosure may be any one or more flame retardants suitable for preparing a prepreg, a resin film, a laminate or a printed circuit board; examples include but are not limited to phosphorus-containing flame retardant, preferably including ammonium polyphosphate, hydroquinone bis(diphenyl phosphate), bisphenol A bis(diphenylphosphate), tri(2-carboxyethyl) phosphine (TCEP), phosphoric acid tris(chloroisopropyl) ester, trimethyl phosphate (TMP), dimethyl methyl phosphonate (DMMP), resorcinol bis(dixylenyl phosphate) (RDXP, such as commercially available PX-200, PX-201, and PX-202), phosphazene (such as commercially available SPB-100, SPH-100, and SPV-100), melamine polyphosphate, 9,10-dihydro-9-oxa-10-phosphaphenanthrene-10-oxide (DOPO) and its derivatives or resins, diphenylphosphine oxide (DPPO) and its derivatives or resins, melamine cyanurate, tris(2-hydroxyethyl) isocyanurate, aluminium phosphinate (e.g., commercially available OP-930 and OP-935), or a combination thereof.

For example, the flame retardant may be a DPPO compound (e.g., di-DPPO compound), a DOPO compound (e.g., di-DOPO compound), a DOPO resin (e.g., DOPO-HQ, DOPO-NQ, DOPO-PN, and DOPO-BPN) and a DOPO-containing epoxy resin, wherein DOPO-PN is a DOPO phenol novolac compound, and DOPO-BPN may be a DOPO-containing bisphenol novolac compound, such as DOPO-BPAN (DOPO-bisphenol A novolac), DOPO-BPFN (DOPO-bisphenol F novolac) and DOPO-BPSN (DOPO-bisphenol S novolac). In some embodiments, the present disclosure uses the additive type phosphorus-containing flame retardant (e.g., BP-PZ) available from Otsuka Chemical Co., Ltd.

Relative to a total of 100 parts by weight of the prepolymerized resin and the additive, the amount of flame retardant used in the present disclosure is not particularly limited, and may range from 1 to 100 parts by weight, such as 10 to 90 parts by weight, 20 to 80 parts by weight, 30 to 70 parts by weight, or 40 to 60 parts by weight.

The inorganic filler suitable for the present disclosure may be any one or more inorganic fillers suitable for preparing a prepreg, a resin film, a laminate or a printed circuit board; in some embodiments, examples of inorganic filler include but are not limited to silica (fused, non-fused, porous or hollow type), aluminum oxide, aluminum hydroxide, magnesium oxide, magnesium hydroxide, calcium carbonate, aluminum nitride, boron nitride, aluminum silicon carbide, silicon carbide, titanium dioxide, zinc oxide, zirconium oxide, mica, boehmite (AlOOH), calcined talc, talc, silicon nitride, calcined kaolin or a combination thereof. Moreover, the inorganic filler can be spherical, fibrous, plate-like, particulate, sheet-like, whisker-like or a combination thereof in shape and can be optionally pretreated by a silane coupling agent. In some embodiments, the present disclosure uses the spherical silica (e.g., SC-2500 SVJ) available from Admatechs.

Relative to a total of 100 parts by weight of the prepolymerized resin and the additive, the amount of inorganic filler used in the present disclosure is not particularly limited, and may range from 1 to 200 parts by weight, such as 10 to 180 parts by weight or 50 to 150 parts by weight.

The curing accelerator (including curing initiator) suitable for the present disclosure may comprise a catalyst, such as a Lewis base or a Lewis acid. The Lewis base may comprise any one or more of imidazole, boron trifluoride-amine complex, ethyltriphenyl phosphonium chloride, 2-methylimidazole (2MI), 2-phenyl-1H-imidazole (2PZ), 2-ethyl-4-methylimidazole (2E4MI), triphenylphosphine (TPP) and 4-dimethylaminopyridine (DMAP). The Lewis acid may comprise metal salt compounds, such as those of manganese, iron, cobalt, nickel, copper and zinc, such as zinc octanoate or cobalt octanoate. A curing accelerator may include a curing initiator, such as a peroxide capable of producing free radicals; examples of the curing initiator may comprise, but not limited to: dicumyl peroxide, t-butyl peroxybenzoate, dibenzoyl peroxide (BPO), 2,5-dimethylethane-2,5-dihydroperoxide, 2,5-dimethyl-2,5-di(t-butylperoxy)-3-hexyne, di-t-butyl peroxide, α,α'-di(t-butylperoxy-m-isopropyl)benzene, 2,5-dimethyl-2,5-di(t-butylperoxy) hexane, di(t-butylperoxy)phthalate, t-butyl peroxybenzoate, 2,2-di(t-butylperoxy)butane, 2,2-di(t-butylperoxy)octane, 2,5-dimethyl-2,5-di(benzoylperoxy)hexane, bis(trimethylsiloxy) peroxide, trimethylsiloxyphenyl triphenyl methylsiloxyperoxide, 2,3-trimethylsiloxyperoxy-2,3-diphenylbutane or a combination thereof. The amount of the curing accelerator, relative to 100 parts by weight of the prepolymerized resin, may be 0.01-5 parts by weight, preferably 0.1-2 parts by weight.

The purpose of adding solvent is to change the solid content of the resin composition and to adjust the viscosity of the resin composition. For example, the solvent suitable for the present disclosure may comprise, but not limited to, methanol, ethanol, ethylene glycol monomethyl ether, acetone, butanone (methyl ethyl ketone), methyl isobutyl ketone, cyclohexanone, toluene, xylene, methoxyethyl acetate, ethoxyethyl acetate, propoxyethyl acetate, ethyl acetate, dimethylformamide, dimethylacetamide, propylene glycol methyl ether, or a mixture thereof.

Silane coupling agent suitable for the present disclosure may comprise silane (such as but not limited to siloxane) and a combination thereof, which may be further categorized according to the functional groups into amino silane, epoxide silane, vinyl silane, acrylate silane, methacrylate silane, hydroxyl silane, isocyanate silane, methacryloxy silane and acryloxy silane.

The purpose of adding toughening agent is to improve the toughness of the resin composition. The toughening agent suitable for the present disclosure may comprise, but not limited to, rubber resin, carboxyl-terminated butadiene acrylonitrile rubber (CTBN rubber), core-shell rubber, or a combination thereof.

The article made from the resin composition disclosed herein comprises but is not limited to a resin film, a prepreg, a laminate or a printed circuit board.

The article made from the resin composition may be a resin film which is prepared by heating and baking to semi-cure the resin composition (B-stage). The resin composition may be selectively coated on a polyethylene terephthalate film (PET film), a polyimide film (PI film), a liquid crystal resin film or a copper to form a resin-coated copper (RCC), followed by heating and baking to semi-cure the resin composition to convert the resin composition into a resin film.

The article made from the resin composition may be a prepreg, which comprises a reinforcement material and a layered structure formed thereon. The layered structure is formed by heating the resin composition at a high temperature to the B-stage. Suitable baking temperature for making the prepreg may be for example 80° C. to 170° C. For example, the reinforcement material may be any one of a fiber material, woven fabric, and non-woven fabric, and the woven fabric preferably comprises fiberglass fabrics. Types of fiberglass fabrics are not particularly limited and may be any commercial fiberglass fabric used for various printed circuit boards, such as E-glass fabric, D-glass fabric, S-glass fabric, T-glass fabric, L-glass fabric or Q-glass fabric, wherein the fiber may comprise yarns and rovings, in spread form or standard form. Non-woven fabric preferably comprises liquid crystal polymer non-woven fabric, such as polyester non-woven fabric, polyurethane non-woven fabric and so on, but not limited thereto. Woven fabric may also comprise liquid crystal polymer woven fabric, such as polyester woven fabric, polyurethane woven fabric and so on, but not limited thereto. The reinforcement material may increase the mechanical strength of the prepreg. In one preferred embodiment, the reinforcement material can be optionally pre-treated by a silane coupling agent. The prepreg may be further heated and cured to the C-stage to form an insulation layer.

The article made from the resin composition may be a laminate, which comprises two metal foils and an insulation layer (e.g., the layered structure after being cured) disposed between the metal foils, wherein the insulation layer is made by curing the resin composition at high temperature and high pressure to the C-stage, a suitable curing temperature being for example between 150° C. and 220° C. and preferably between 190° C. and 210° C. and a suitable curing time being 90 to 200 minutes and preferably 120 to 180 minutes. The insulation layer may be obtained by curing the aforesaid prepreg or resin film. The metal foil may comprise copper, aluminum, nickel, platinum, silver, gold or an alloy thereof, such as a copper foil.

Preferably, the laminate is a copper-clad laminate (CCL).

The laminate may be further processed by trace formation processes to provide a printed circuit board.

Articles made according to the present disclosure preferably have at least one of the following properties or features:

(1) a glass transition temperature as measured by reference to IPC-TM-650 2.4.24.5 of greater than or equal to 200° C.;

(2) as measured by reference to JIS C2565, a dissipation factor of less than or equal to 0.004 and a dielectric constant of less than or equal to 3.5;

(3) a peel strength as measured by reference to IPC-TM-650 2.4.8 of greater than or equal to 3.0 lb/in, preferably greater than or equal to 3.5 lb/in;

(4) a Z-axis ratio of thermal expansion as measured by reference to IPC-TM-650 2.4.24.5 of less than or equal to 1.75%; and (5) no delamination occurs after moisture absorption of 5 hours as measured by reference to IPC-TM-650 2.6.16.1 and then by reference to IPC-TM-650 2.4.23.

In one embodiment, the article has any one of the aforesaid properties.

In one embodiment, the article has any two of the aforesaid properties.

In one preferred embodiment, the article has all of the aforesaid properties.

The names of chemicals used in the examples and comparative examples are as follows:

H1: OPE-2st 2200, vinylbenzyl-terminated polyphenylene oxide resin, available from Mitsubishi Gas Chemical Co., Inc.

H2: OPE-2st 1200, vinylbenzyl-terminated polyphenylene oxide resin, available from Mitsubishi Gas Chemical Co., Inc.

H3: SA-9000, methacrylate-terminated polyphenylene oxide resin, available from SABIC.

H4: TBS, t-butyl styrene (with p-t-butyl styrene monomer content of greater than 90%), available from Tokyo Chemical Industry Co., Ltd.

H5: divinylbenzene (DVB), available from Nippon Steel & Sumikin Chemical.

H6: BMI-5100, bismaleimide, available from Daiwakasei Industry Co., Ltd.

H7: Ricon 100, styrene-butadiene copolymer, available from Cray Valley.

H8: BP-PZ, additive type phosphorus-containing flame retardant, available from Otsuka Chemical Co., Ltd.

H9: dicumyl peroxide (DCP), available from NOF Corporation.

H10: SC-2500 SVJ, spherical silica, available from Admatechs.

H11: solvent mixture of toluene and methyl ethyl ketone, which are from commercially available source.

H12: TAIC, triallyl isocyanurate, available from Hongdaxingye Group Co., Ltd.

H13: 2,4-diphenyl-4-methyl-1-pentene, available from TCI (Shanghai) Development Co., Ltd.

Preparation Example 1 (for Each Preparation Example, the Solid Content of the Ingredients is 100%)

30 parts by weight of TBS and a proper amount of toluene were added to a stirred reaction tank, and 0.5 part by weight of dicumyl peroxide and 0.5 part by weight of 2,4-diphenyl-4-methyl-1-pentene were fully dissolved in toluene and then added to the stirred reaction tank. The temperature was increased to 85° C. and the first solution during the reaction was stirred constantly at 85° C., followed by batchwise addition of 70 parts by weight of OPE-2st 2200 to the stirred reaction tank within 0.5 hour with continuously stirring. After 3 hours of reaction, the temperature was lowered to room temperature, and the second solution obtained was purified to obtain a product, Prepolymerized Resin A, which is a prepolymerized resin of the present disclosure.

Gel permeation chromatography (GPC) was used to analyze the resin before prepolymerization, as shown in FIG. 1, wherein Peak A is the GPC peak of OPE-2st 2200, and Peak B is the GPC peak of TBS. Polystyrene (narrow molecular weight distribution) was used as the reference in weight-average molecular weight (Mw) measurement.

The resin before prepolymerization refers to a solution containing 30 parts by weight of TBS, 70 parts by weight of OPE-2st 2200 and a proper amount of toluene which were added to the stirred reaction tank and fully dissolved.

Figure 2:
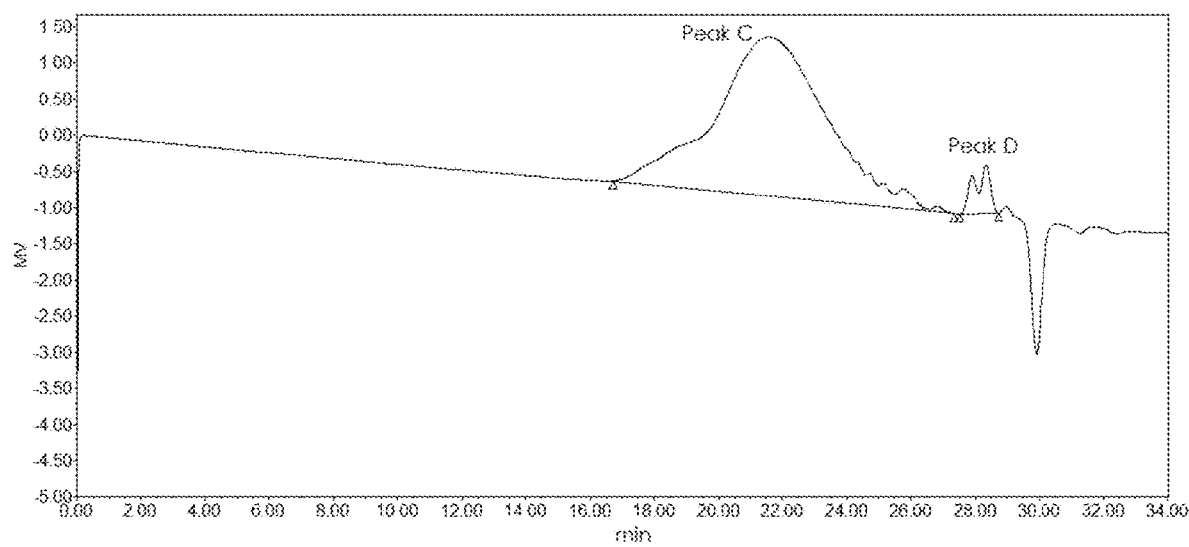
FIG. 2 illustrates the GPC spectrum of Prepolymerized Resin A in Preparation Example 1 after prepolymerization.

Results of GPC analysis on the prepolymerized resin (e.g., resin after prepolymerization) are shown in FIG. 2, wherein Peak C is the GPC peak of the prepolymerized resin, indicating that the Mw of the prepolymer increases from 4237 before the reaction to 7164. Peak D represents the residual TBS not fully reacted after prepolymerization.

Table 1 and Table 2 list the Mw and the integral area of characteristic peak of the resin before prepolymerization and the prepolymerized resin, respectively. Calculation of the peak area indicates that the TBS conversion rate is about 85%. It means that, in Preparation Example 1, t-butyl styrene and unsaturated bond-containing polyphenylene oxide reacted partially to form Prepolymerized Resin A of the present disclosure.

Figure 3:
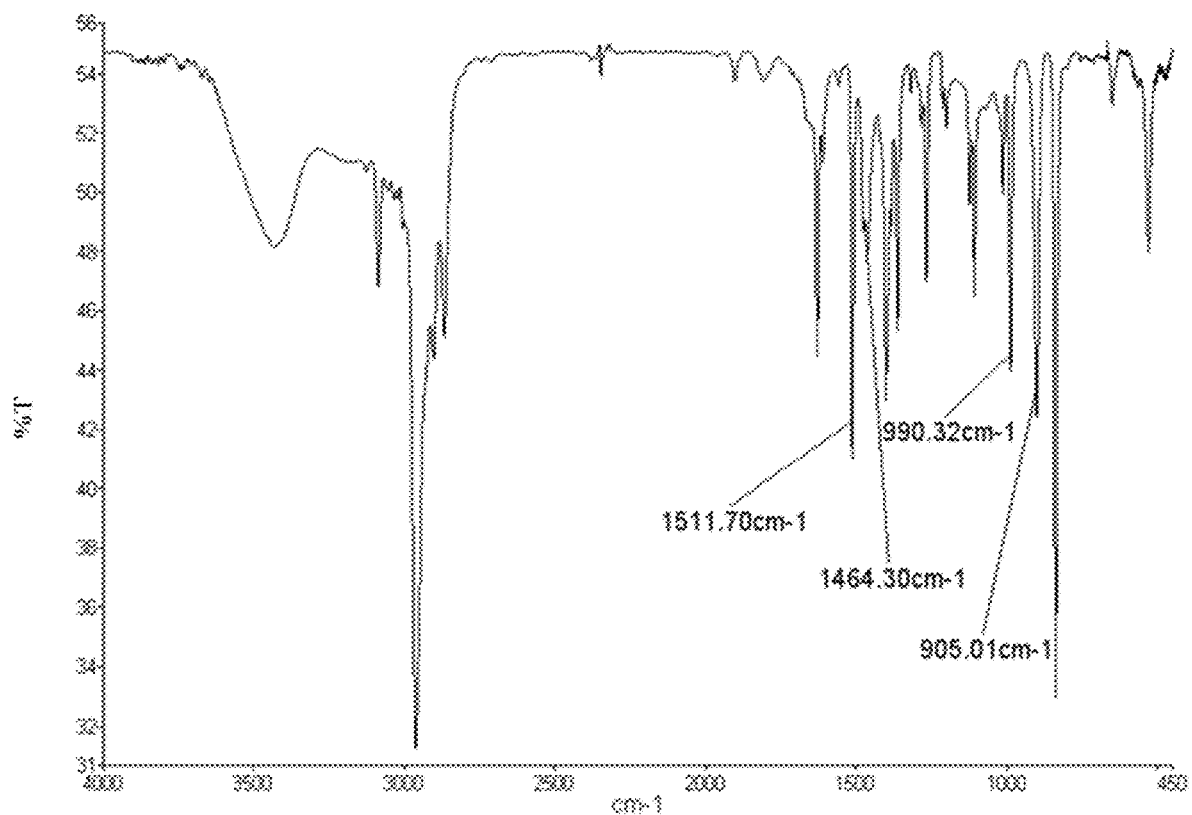
FIG. 3 illustrates the FTIR spectrum of t-butyl styrene (TBS) in Preparation Example 1.
Figure 4:
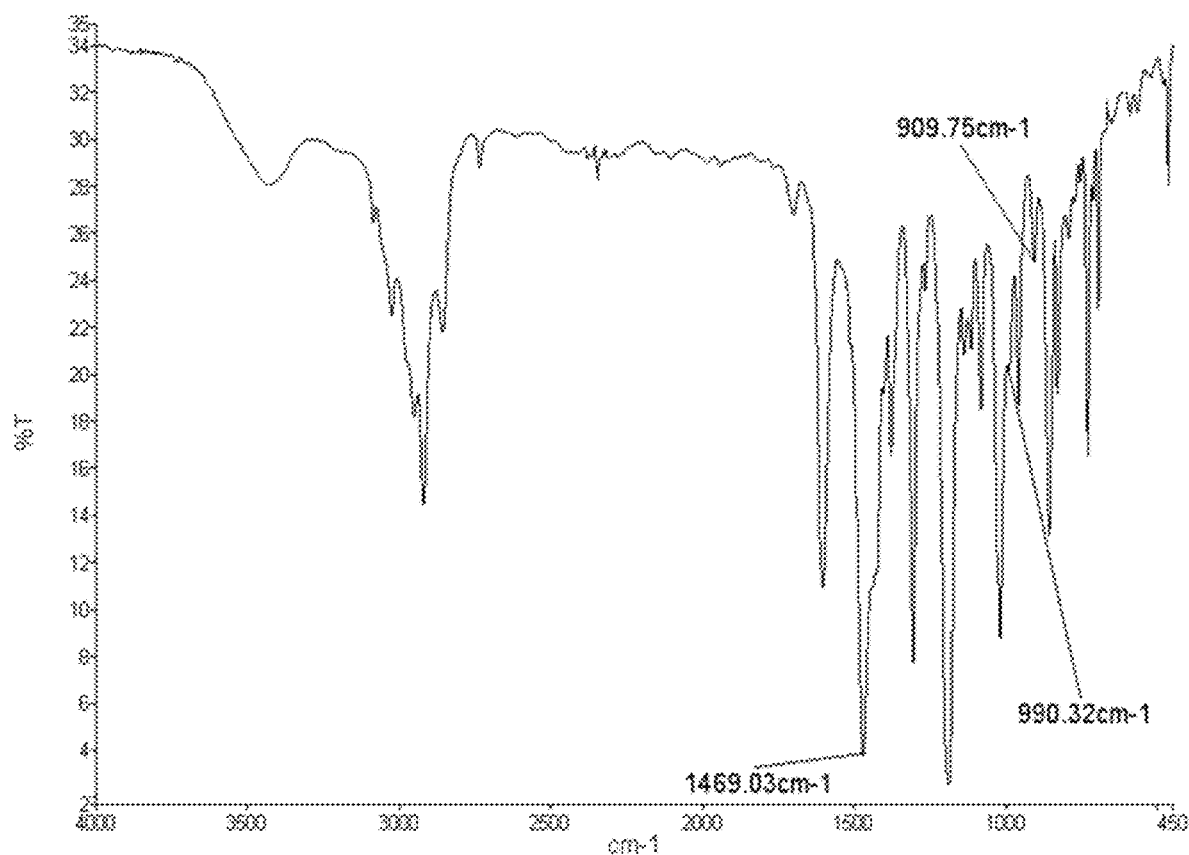
FIG. 4 illustrates the FTIR spectrum of vinylbenzyl-terminated polyphenylene oxide resin (OPE-2st 2200) in Preparation Example 1.
Figure 5:
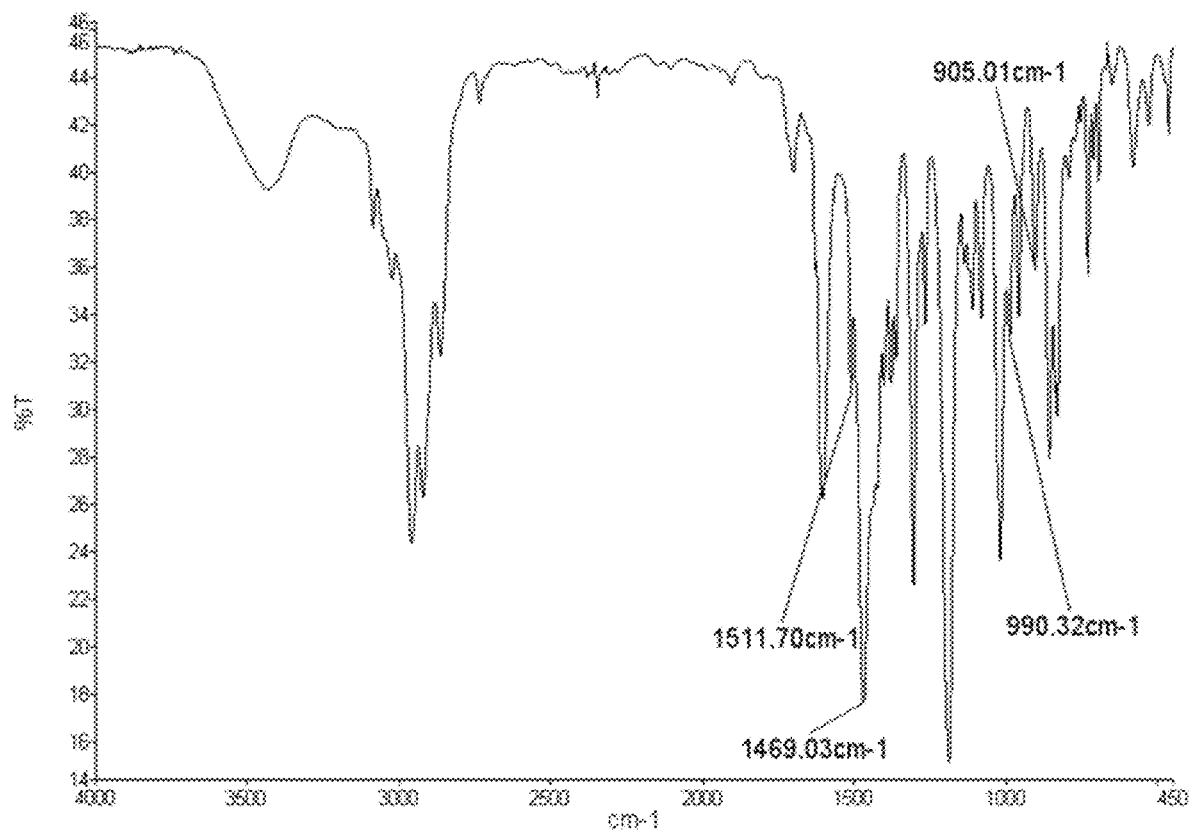
FIG. 5 illustrates the FTIR spectrum of Prepolymerized Resin A in Preparation Example 1 after prepolymerization.

FTIR was used to analyze the resin before prepolymerization and the prepolymerized resin. FIG. 3 illustrates the FTIR spectrum of TBS, wherein 1511.70 $cm^{-1}$ and 1464.30 $cm^{-1}$ represent characteristic peaks of benzene ring, the signal at 1511.70 $cm^{-1}$ is stronger than that at 1464.30 $cm^{-1}$, and 990.32 $cm^{-1}$ and 905.01 $cm^{-1}$ represent characteristic peaks of TBS C=C double bond. FIG. 4 illustrates the FTIR spectrum of OPE-2st 2200, wherein 1469.03 $cm^{-1}$ represents characteristic peak of benzene ring, and 909.75 $cm^{-1}$ represent characteristic peak of PPO terminal C=C double bond. FIG. 5 illustrates the FTIR spectrum of the prepolymerized resin, wherein the TBS unique benzene ring characteristic peak appears at 1511.70 $cm^{-1}$, and the signal at 1511.70 $cm^{-1}$ is weaker than that of 1464.30 $cm^{-1}$. In addition, the presence of the characteristic peaks of C=C double bond at 990.32 $cm^{-1}$ and 905.01 $cm^{-1}$ indicates that the prepolymerized resin contains reactive vinyl groups.

TABLE 1

Mw and integral area of characteristic peak of resin before prepolymerization

|  | Mw (Dalton) | Integral area |
| --- | --- | --- |
| Peak A | 4237 | 421969 |
| Peak B | 163 | 157180 |

TABLE 2

Mw and integral area of characteristic peak of prepolymerized resin

|  | Mw (Dalton) | Integral area |
| --- | --- | --- |
| Peak C | 7164 | 534572 |
| Peak D | 162 | 23377 |

Preparation Example 2

30 parts by weight of TBS and a proper amount of toluene were added to a stirred reaction tank, and 0.5 part by weight of dicumyl peroxide and 0.5 part by weight of 2,4-diphenyl-4-methyl-1-pentene were fully dissolved in toluene and then added to the stirred reaction tank. The temperature was increased to 85° C. and the reaction was stirred constantly at 85° C., followed by batchwise addition of 70 parts by weight of OPE-2st 1200 to the stirred reaction tank within 0.5 hour with continuously stirring. After 3 hours of reaction, the temperature was lowered to room temperature, and the solution obtained was purified to obtain a product, Prepolymerized Resin B, which is a prepolymerized resin of the present disclosure.

Preparation Example 3

30 parts by weight of TBS and a proper amount of toluene were added to a stirred reaction tank, and 0.5 part by weight of dicumyl peroxide and 0.5 part by weight of 2,4-diphenyl-4-methyl-1-pentene were fully dissolved in toluene and then added to the stirred reaction tank. The temperature was increased to 85° C. and the reaction was stirred constantly at 85° C., followed by batchwise addition of 70 parts by weight of SA-9000 to the stirred reaction tank within 0.5 hour with continuously stirring. After 3 hours of reaction, the temperature was lowered to room temperature, and the solution obtained was purified to obtain a product, Prepolymerized Resin C, which is a prepolymerized resin of the present disclosure.

Preparation Example 4

50 parts by weight of TBS and a proper amount of toluene were added to a stirred reaction tank, and 0.5 part by weight of dicumyl peroxide and 0.5 part by weight of 2,4-diphenyl-4-methyl-1-pentene were fully dissolved in toluene and then added to the stirred reaction tank. The temperature was increased to 85° C. and the reaction was stirred constantly at 85° C., followed by batchwise addition of 50 parts by weight of OPE-2st 1200 to the stirred reaction tank within 0.5 hour with continuously stirring. After 3 hours of reaction, the temperature was lowered to room temperature, and the solution obtained was purified to obtain a product, Prepolymerized Resin D, which is a prepolymerized resin of the present disclosure.

Preparation Example 5

50 parts by weight of TBS and a proper amount of toluene were added to a stirred reaction tank, and 0.5 part by weight of dicumyl peroxide and 0.5 part by weight of 2,4-diphenyl-4-methyl-1-pentene were fully dissolved in toluene and then added to the stirred reaction tank. The temperature was increased to 85° C. and the reaction was stirred constantly at 85° C., followed by batchwise addition of 50 parts by weight of SA-9000 to the stirred reaction tank within 0.5 hour with continuously stirring. After 3 hours of reaction, the temperature was lowered to room temperature, and the solution obtained was purified to obtain a product, Prepolymerized Resin E, which is a prepolymerized resin of the present disclosure.

Preparation Example 6

20 parts by weight of TBS and a proper amount of toluene were added to a stirred reaction tank, and 0.5 part by weight of dicumyl peroxide and 0.5 part by weight of 2,4-diphenyl-4-methyl-1-pentene were fully dissolved in toluene and then added to the stirred reaction tank. The temperature was increased to 85° C. and the reaction was stirred constantly at 85° C., followed by batchwise addition of 80 parts by weight of OPE-2st 1200 to the stirred reaction tank within 0.5 hour with continuously stirring. After 3 hours of reaction, the temperature was lowered to room temperature, and the solution obtained was purified to obtain a product, Prepolymerized Resin F, which is a prepolymerized resin of the present disclosure.

Preparation Example 7

30 parts by weight of TBS and a proper amount of toluene were added to a stirred reaction tank, and 0.5 part by weight of dicumyl peroxide and 0.5 part by weight of 2,4-diphenyl-4-methyl-1-pentene were fully dissolved in toluene and then added to the stirred reaction tank. The temperature was increased to 85° C. and the reaction was stirred constantly at 85° C., followed by batchwise addition of 35 parts by weight of OPE-2st 1200 and 35 parts by weight of SA-9000 to the stirred reaction tank within 0.5 hour with continuously stirring. After 3 hours of reaction, the temperature was lowered to room temperature, and the solution obtained was purified to obtain a product, Prepolymerized Resin G, which is a prepolymerized resin of the present disclosure.

Preparation Example 8

30 parts by weight of TBS and a proper amount of toluene were added to a stirred reaction tank, and 0.5 part by weight of dicumyl peroxide and 0.5 part by weight of 2,4-diphenyl-4-methyl-1-pentene were fully dissolved in toluene and then added to the stirred reaction tank. The temperature was increased to 85° C. and the reaction was stirred constantly at 85° C., followed by batchwise addition of 20 parts by weight of OPE-2st 2200, 30 parts by weight of OPE-2st 1200 and 20 parts by weight of SA-9000 to the stirred reaction tank within 0.5 hour with continuously stirring. After 3 hours of reaction, the temperature was lowered to room temperature, and the solution obtained was purified to obtain a product, Prepolymerized Resin H, which is a prepolymerized resin of the present disclosure.

Preparation Example 9

30 parts by weight of TBS and a proper amount of toluene were added to a stirred reaction tank, and 0.5 part by weight of dicumyl peroxide and 0.5 part by weight of 2,4-diphenyl-4-methyl-1-pentene were fully dissolved in toluene and then added to the stirred reaction tank. The temperature was increased to 85° C. and the reaction was stirred constantly at 85° C., followed by batchwise addition of 50 parts by weight of OPE-2st 1200 to the stirred reaction tank within 0.5 hour with continuously stirring. After 3 hours of reaction, the temperature was lowered to room temperature, and the solution obtained was purified to obtain a product, Prepolymerized Resin I, which is a prepolymerized resin of the present disclosure.

Preparation Example 10

30 parts by weight of TBS and a proper amount of toluene were added to a stirred reaction tank, and 0.5 part by weight of dicumyl peroxide and 0.5 part by weight of 2,4-diphenyl-4-methyl-1-pentene were fully dissolved in toluene and then added to the stirred reaction tank. The temperature was increased to 85° C. and the reaction was stirred constantly at 85° C., followed by batchwise addition of 20 parts by weight of OPE-2st 2200 and 30 parts by weight of OPE-2st 1200 to the stirred reaction tank within 0.5 hour with continuously stirring. After 3 hours of reaction, the temperature was lowered to room temperature, and the solution obtained was purified to obtain a product, Prepolymerized Resin J, which is a prepolymerized resin of the present disclosure.

Preparation Example 11

60 parts by weight of TBS and a proper amount of toluene were added to a stirred reaction tank, and 0.5 part by weight of dicumyl peroxide and 0.5 part by weight of 2,4-diphenyl-4-methyl-1-pentene were fully dissolved in toluene and then added to the stirred reaction tank. The temperature was increased to 85° C. and the reaction was stirred constantly at 85° C., followed by batchwise addition of 40 parts by weight of SA-9000 to the stirred reaction tank within 0.5 hour with continuously stirring. After 3 hours of reaction, the temperature was lowered to room temperature, and the solution obtained was purified to obtain a product, Prepolymerized Resin K, which is a prepolymerized resin of the present disclosure.

Preparation Example 12

10 parts by weight of TBS and a proper amount of toluene were added to a stirred reaction tank, and 0.5 part by weight of dicumyl peroxide and 0.5 part by weight of 2,4-diphenyl-4-methyl-1-pentene were fully dissolved in toluene and then added to the stirred reaction tank. The temperature was increased to 85° C. and the reaction was stirred constantly at 85° C., followed by batchwise addition of 90 parts by weight of OPE-2st 1200 to the stirred reaction tank within 0.5 hour with continuously stirring. After 3 hours of reaction, the temperature was lowered to room temperature, and the solution obtained was purified to obtain a product, Prepolymerized Resin L, which is a prepolymerized resin of the present disclosure.

Preparation Example 13

25 parts by weight of TBS, 5 parts by weight of DVB and a proper amount of toluene were added to a stirred reaction tank, and 0.5 part by weight of dicumyl peroxide and 0.5 part by weight of 2,4-diphenyl-4-methyl-1-pentene were fully dissolved in toluene and then added to the stirred reaction tank. The temperature was increased to 85° C. and the reaction was stirred constantly at 85° C., followed by batchwise addition of 70 parts by weight of OPE-2st 2200 to the stirred reaction tank within 0.5 hour with continuously stirring. After 3 hours of reaction, the temperature was lowered to room temperature, and the solution obtained was purified to obtain a product, Prepolymerized Resin M, which is a prepolymerized resin of the present disclosure.

Example 1 (for Each Example, the Solid Content of the Ingredients is 100%)

In Prepolymerized Resin A, 20 parts by weight of BMI-5100, 15 parts by weight of Ricon 100 and a proper amount of a solvent mixture containing toluene and methyl ethyl ketone were added and stirred and mixed to a homogeneous state. Then 45 parts by weight of BP-PZ and 135 parts by weight of SC2500-SVJ were added. The solution was fully stirred and then added with DCP dissolved in methyl ethyl ketone (0.5 part by weight of DCP) and then stirred for 0.5 hour to obtain Resin Composition E1.

Example 2

In Prepolymerized Resin B, 20 parts by weight of BMI-5100, 15 parts by weight of Ricon 100 and a proper amount of a solvent mixture containing toluene and methyl ethyl ketone were added and stirred and mixed to a homogeneous state. Then 45 parts by weight of BP-PZ and 135 parts by weight of SC2500-SVJ were added. The solution was fully stirred and then added with DCP dissolved in methyl ethyl ketone (0.5 part by weight of DCP) and then stirred for 0.5 hour to obtain Resin Composition E2.

Example 3

In Prepolymerized Resin C, 20 parts by weight of BMI-5100, 15 parts by weight of Ricon 100 and a proper amount of a solvent mixture containing toluene and methyl ethyl ketone were added and stirred and mixed to a homogeneous state. Then 45 parts by weight of BP-PZ and 135 parts by weight of SC2500-SVJ were added. The solution was fully stirred and then added with DCP dissolved in methyl ethyl ketone (0.5 part by weight of DCP) and then stirred for 0.5 hour to obtain Resin Composition E3.

Example 4

In Prepolymerized Resin D, 20 parts by weight of BMI-5100, 15 parts by weight of Ricon 100 and a proper amount of a solvent mixture containing toluene and methyl ethyl ketone were added and stirred and mixed to a homogeneous state. Then 45 parts by weight of BP-PZ and 135 parts by weight of SC2500-SVJ were added. The solution was fully stirred and then added with DCP dissolved in methyl ethyl ketone (0.5 part by weight of DCP) and then stirred for 0.5 hour to obtain Resin Composition E4.

Example 5

In Prepolymerized Resin E, 20 parts by weight of BMI-5100, 15 parts by weight of Ricon 100 and a proper amount of a solvent mixture containing toluene and methyl ethyl ketone were added and stirred and mixed to a homogeneous state. Then 45 parts by weight of BP-PZ and 135 parts by weight of SC2500-SVJ were added. The solution was fully stirred and then added with DCP dissolved in methyl ethyl ketone (0.5 part by weight of DCP) and then stirred for 0.5 hour to obtain Resin Composition E5.

Example 6

In Prepolymerized Resin F, 20 parts by weight of BMI-5100, 15 parts by weight of Ricon 100 and a proper amount of a solvent mixture containing toluene and methyl ethyl ketone were added and stirred and mixed to a homogeneous state. Then 45 parts by weight of BP-PZ and 135 parts by weight of SC2500-SVJ were added. The solution was fully stirred and then added with DCP dissolved in methyl ethyl ketone (0.5 part by weight of DCP) and then stirred for 0.5 hour to obtain Resin Composition E6.

Example 7

In Prepolymerized Resin G, 20 parts by weight of BMI-5100, 15 parts by weight of Ricon 100 and a proper amount of a solvent mixture containing toluene and methyl ethyl ketone were added and stirred and mixed to a homogeneous state. Then 45 parts by weight of BP-PZ and 135 parts by weight of SC2500-SVJ were added. The solution was fully stirred and then added with DCP dissolved in methyl ethyl ketone (0.5 part by weight of DCP) and then stirred for 0.5 hour to obtain Resin Composition E7.

Example 8

In Prepolymerized Resin H, 20 parts by weight of BMI-5100, 15 parts by weight of Ricon 100 and a proper amount of a solvent mixture containing toluene and methyl ethyl ketone were added and stirred and mixed to a homogeneous state. Then 45 parts by weight of BP-PZ and 135 parts by weight of SC2500-SVJ were added. The solution was fully stirred and then added with DCP dissolved in methyl ethyl ketone (0.5 part by weight of DCP) and then stirred for 0.5 hour to obtain Resin Composition E8.

Example 9

In Prepolymerized Resin I, 20 parts by weight of OPE-2st 1200, 20 parts by weight of BMI-5100, 15 parts by weight of Ricon 100 and a proper amount of a solvent mixture containing toluene and methyl ethyl ketone were added and stirred and mixed to a homogeneous state. Then 45 parts by weight of BP-PZ and 135 parts by weight of SC2500-SVJ were added. The solution was fully stirred and then added with DCP dissolved in methyl ethyl ketone (0.5 part by weight of DCP) and then stirred for 0.5 hour to obtain Resin Composition E9.

Example 10

In Prepolymerized Resin J, 20 parts by weight of SA-9000, 20 parts by weight of BMI-5100, 15 parts by weight of Ricon 100 and a proper amount of a solvent mixture containing toluene and methyl ethyl ketone were added and stirred and mixed to a homogeneous state. Then 45 parts by weight of BP-PZ and 135 parts by weight of SC2500-SVJ were added. The solution was fully stirred and then added with DCP dissolved in methyl ethyl ketone (0.5 part by weight of DCP) and then stirred for 0.5 hour to obtain Resin Composition E10.

Example 11

In Prepolymerized Resin G, 35 parts by weight of BMI-5100, 25 parts by weight of Ricon 100 and a proper amount of a solvent mixture containing toluene and methyl ethyl ketone were added and stirred and mixed to a homogeneous state. Then 45 parts by weight of BP-PZ and 135 parts by weight of SC2500-SVJ were added. The solution was fully stirred and then added with DCP dissolved in methyl ethyl ketone (0.5 part by weight of DCP) and then stirred for 0.5 hour to obtain Resin Composition E11.

Example 12

In Prepolymerized Resin G, 10 parts by weight of BMI-5100, 5 parts by weight of Ricon 100 and a proper amount of a solvent mixture containing toluene and methyl ethyl ketone were added and stirred and mixed to a homogeneous state. Then 45 parts by weight of BP-PZ and 135 parts by weight of SC2500-SVJ were added. The solution was fully stirred and then added with DCP dissolved in methyl ethyl ketone (0.5 part by weight of DCP) and then stirred for 0.5 hour to obtain Resin Composition E12.

Example 13

In Prepolymerized Resin K, 20 parts by weight of BMI-5100, 15 parts by weight of Ricon 100 and a proper amount of a solvent mixture containing toluene and methyl ethyl ketone were added and stirred and mixed to a homogeneous state. Then 45 parts by weight of BP-PZ and 135 parts by weight of SC2500-SVJ were added. The solution was fully stirred and then added with DCP dissolved in methyl ethyl ketone (0.5 part by weight of DCP) and then stirred for 0.5 hour to obtain Resin Composition E13.

Example 14

In Prepolymerized Resin L, 20 parts by weight of BMI-5100, 15 parts by weight of Ricon 100 and a proper amount of a solvent mixture containing toluene and methyl ethyl ketone were added and stirred and mixed to a homogeneous state. Then 45 parts by weight of BP-PZ and 135 parts by weight of SC2500-SVJ were added. The solution was fully stirred and then added with DCP dissolved in methyl ethyl ketone (0.5 part by weight of DCP) and then stirred for 0.5 hour to obtain Resin Composition E14.

Example 15

In Prepolymerized Resin M, 20 parts by weight of BMI-5100, 15 parts by weight of Ricon 100 and a proper amount of a solvent mixture containing toluene and methyl ethyl ketone were added and stirred and mixed to a homogeneous state. Then 45 parts by weight of BP-PZ and 135 parts by weight of SC2500-SVJ were added. The solution was fully stirred and then added with DCP dissolved in methyl ethyl ketone (0.5 part by weight of DCP) and then stirred for 0.5 hour to obtain Resin Composition E15.

Comparative Example 1 (for Each Comparative Example, the Solid Content of the Ingredients is 100%)

30 parts by weight of TAIC and a proper amount of toluene were added to a stirred reaction tank, and 0.5 part by weight of dicumyl peroxide and 0.5 part by weight of 2,4-diphenyl-4-methyl-1-pentene were fully dissolved in toluene and then added to the stirred reaction tank. The temperature was increased to 85° C. and the reaction was stirred constantly at 85° C., followed by batchwise addition of 70 parts by weight of OPE-2st 1200 to the stirred reaction tank within 0.5 hour with continuously stirring. After 3 hours of reaction, the temperature was lowered to room temperature, and the solution obtained was purified to obtain a product, Prepolymerized Resin O. In Prepolymerized Resin O, 20 parts by weight of BMI-5100, 15 parts by weight of Ricon 100 and a proper amount of a solvent mixture containing toluene and methyl ethyl ketone were added and stirred and mixed to a homogeneous state. Then 45 parts by weight of BP-PZ and 135 parts by weight of SC2500-SVJ were added. The solution was fully stirred and then added with DCP dissolved in methyl ethyl ketone (0.5 part by weight of DCP) and then stirred for 0.5 hour to obtain Resin Composition of Comparative Example C1.

Comparative Example 2

In a mixture of 70 parts by weight of OPE-2st 1200 and 30 parts by weight of TBS, 20 parts by weight of BMI-5100, 15 parts by weight of Ricon 100 and a proper amount of a solvent mixture containing toluene and methyl ethyl ketone were added and stirred and mixed to a homogeneous state. Then 45 parts by weight of BP-PZ and 135 parts by weight of SC2500-SVJ were added. The solution was fully stirred and then added with DCP dissolved in methyl ethyl ketone (0.5 part by weight of DCP) and then stirred for 0.5 hour to obtain Resin Composition of Comparative Example C2.

Comparative Example 3

In 100 parts by weight of OPE-2st 1200, 20 parts by weight of BMI-5100, 15 parts by weight of Ricon 100 and a proper amount of a solvent mixture containing toluene and methyl ethyl ketone were added and stirred and mixed to a homogeneous state. Then 45 parts by weight of BP-PZ and 135 parts by weight of SC2500-SVJ were added. The solution was fully stirred and then added with DCP dissolved in methyl ethyl ketone (0.5 part by weight of DCP) and then stirred for 0.5 hour to obtain Resin Composition of Comparative Example C3.

Comparative Example 4

In a mixture of 50 parts by weight of OPE-2st 1200 and 50 parts by weight of TBS, 20 parts by weight of BMI-5100, 15 parts by weight of Ricon 100 and a proper amount of a solvent mixture containing toluene and methyl ethyl ketone were added and stirred and mixed to a homogeneous state. Then 45 parts by weight of BP-PZ and 135 parts by weight of SC2500-SVJ were added. The solution was fully stirred and then added with DCP dissolved in methyl ethyl ketone (0.5 part by weight of DCP) and then stirred for 0.5 hour to obtain Resin Composition of Comparative Example C4.

Comparative Example 5

In a mixture of 50 parts by weight of SA-9000 and 50 parts by weight of TBS, 20 parts by weight of BMI-5100, 15 parts by weight of Ricon 100 and a proper amount of a solvent mixture containing toluene and methyl ethyl ketone were added and stirred and mixed to a homogeneous state. Then 45 parts by weight of BP-PZ and 135 parts by weight of SC2500-SVJ were added. The solution was fully stirred and then added with DCP dissolved in methyl ethyl ketone (0.5 part by weight of DCP) and then stirred for 0.5 hour to obtain Resin Composition of Comparative Example C5.

Comparative Example 6

In a mixture of 80 parts by weight of OPE-2st 1200 and 20 parts by weight of TBS, 20 parts by weight of BMI-5100, 15 parts by weight of Ricon 100 and a proper amount of a solvent mixture containing toluene and methyl ethyl ketone were added and stirred and mixed to a homogeneous state. Then 45 parts by weight of BP-PZ and 135 parts by weight of SC2500-SVJ were added. The solution was fully stirred and then added with DCP dissolved in methyl ethyl ketone (0.5 part by weight of DCP) and then stirred for 0.5 hour to obtain Resin Composition of Comparative Example C6.

Comparative Example 7

In a mixture of 35 parts by weight of OPE-2st 1200, 35 parts by weight of SA-9000 and 30 parts by weight of TBS, 20 parts by weight of BMI-5100, 15 parts by weight of Ricon 100 and a proper amount of a solvent mixture containing toluene and methyl ethyl ketone were added and stirred and mixed to a homogeneous state. Then 45 parts by weight of BP-PZ and 135 parts by weight of SC2500-SVJ were added. The solution was fully stirred and then added with DCP dissolved in methyl ethyl ketone (0.5 part by weight of DCP) and then stirred for 0.5 hour to obtain Resin Composition of Comparative Example C7.

Comparative Example 8

In a mixture of 50 parts by weight of OPE-2st 1200, 20 parts by weight of SA-9000 and 30 parts by weight of TBS, 20 parts by weight of BMI-5100, 15 parts by weight of Ricon 100 and a proper amount of a solvent mixture containing toluene and methyl ethyl ketone were added and stirred and mixed to a homogeneous state. Then 45 parts by weight of BP-PZ and 135 parts by weight of SC2500-SVJ were added. The solution was fully stirred and then added with DCP dissolved in methyl ethyl ketone (0.5 part by weight of DCP) and then stirred for 0.5 hour to obtain Resin Composition of Comparative Example C8.

Comparative Example 9

In a mixture of 20 parts by weight of OPE-2st 2200, 30 parts by weight of OPE-2st 1200, 20 parts by weight of SA-9000 and 30 parts by weight of TBS, 20 parts by weight of BMI-5100, 15 parts by weight of Ricon 100 and a proper amount of a solvent mixture containing toluene and methyl ethyl ketone were added and stirred and mixed to a homogeneous state. Then 45 parts by weight of BP-PZ and 135 parts by weight of SC2500-SVJ were added. The solution was fully stirred and then added with DCP dissolved in methyl ethyl ketone (0.5 part by weight of DCP) and then stirred for 0.5 hour to obtain Resin Composition of Comparative Example C9.

Comparative Example 10

30 parts by weight of TAIC and a proper amount of toluene were added to a stirred reaction tank, and 0.5 part by weight of dicumyl peroxide and 0.5 part by weight of 2,4-diphenyl-4-methyl-1-pentene were fully dissolved in toluene and then added to the stirred reaction tank. The temperature was increased to 85° C. and the reaction was stirred constantly at 85° C., followed by batchwise addition of 50 parts by weight of OPE-2st 1200 to the stirred reaction tank within 0.5 hour with continuously stirring. After 3 hours of reaction, the temperature was lowered to room temperature, and the solution obtained was purified to obtain a product, Prepolymerized Resin P. In Prepolymerized Resin P, 20 parts by weight of TAIC, 20 parts by weight of BMI-5100, 15 parts by weight of Ricon 100 and a proper amount of a solvent mixture containing toluene and methyl ethyl ketone were added and stirred and mixed to a homogeneous state. Then 45 parts by weight of BP-PZ and 135 parts by weight of SC2500-SVJ were added. The solution was fully stirred and then added with DCP dissolved in methyl ethyl ketone (0.5 part by weight of DCP) and then stirred for 0.5 hour to obtain Resin Composition of Comparative Example C10.

Resin compositions from individual Example and Comparative Example are listed in Table 3 and Table 4, wherein Examples E1-E8 and E11-E14 contain 100 parts by weight of the prepolymerized resin, Examples E9-E10 contain 80 parts by weight of the prepolymerized resin, Comparative Example C1 contains 100 parts by weight of the prepolymerized resin, and Comparative Example C10 contains 80 parts by weight of the prepolymerized resin. As used herein, "PA" designates a proper amount.

TABLE 3

Resin compositions of Examples (in part by weight)

| Component | | E1 | E2 | E3 | E4 | E5 | E6 | E7 | E8 | E9 | E10 | E11 | E12 | E13 | E14 | E15 |
|---|---|---|---|---|---|---|---|---|---|---|---|---|---|---|---|---|
| Prepolymerized resin | | A | B | C | D | E | F | G | H | I | J | G | G | K | L | M |
| Resin | H2 | | | | | | | | | 20 | | | | | | |
| | H3 | | | | | | | | | | 20 | | | | | |
| | H6 | 20 | 20 | 20 | 20 | 20 | 20 | 20 | 20 | 20 | 20 | 35 | 10 | 20 | 20 | 20 |
| | H7 | 15 | 15 | 15 | 15 | 15 | 15 | 15 | 15 | 15 | 15 | 25 | 5 | 15 | 15 | 15 |
| Flame retardant | H8 | 45 | 45 | 45 | 45 | 45 | 45 | 45 | 45 | 45 | 45 | 45 | 45 | 45 | 45 | 45 |
| Curing initiator | H9 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| Inorganic filler | H10 | 135 | 135 | 135 | 135 | 135 | 135 | 135 | 135 | 135 | 135 | 135 | 135 | 135 | 135 | 135 |
| Solvent | H11 | PA | PA | PA | PA | PA | PA | PA | PA | PA | PA | PA | PA | PA | PA | PA |

TABLE 4

Resin compositions of Comparative Examples (in part by weight)

| Component | | C1 | C2 | C3 | C4 | C5 | C6 | C7 | C8 | C9 | C10 |
|---|---|---|---|---|---|---|---|---|---|---|---|
| Prepolymerized resin | | O | | | | | | | | | P |
| Resin | H1 | | | | | | | | | 20 | |
| | H2 | | 70 | 100 | 50 | | 80 | 35 | 50 | 30 | |
| | H3 | | | | | 50 | | 35 | 20 | 20 | |
| | H4 | | 30 | | 50 | 50 | 20 | 30 | 30 | 30 | |
| | H12 | | | | | | | | | | 20 |
| | H6 | 20 | 20 | 20 | 20 | 20 | 20 | 20 | 20 | 20 | 20 |
| | H7 | 15 | 15 | 15 | 15 | 15 | 15 | 15 | 15 | 15 | 15 |
| Flame retardant | H8 | 45 | 45 | 45 | 45 | 45 | 45 | 45 | 45 | 45 | 45 |
| Curing initiator | H9 | 0.5 | 0.5 | 0.5 | 0.5 | 0.5 | 0.5 | 0.5 | 0.5 | 0.5 | 0.5 |
| Inorganic filler | H10 | 135 | 135 | 135 | 135 | 135 | 135 | 135 | 135 | 135 | 135 |
| Solvent | H11 | PA | PA | PA | PA | PA | PA | PA | PA | PA | PA |

Resin compositions from different Examples (E1 to E15) and Comparative Examples (C1 to C10) listed in Table 3 and Table 4 were respectively added to a stirred tank, well mixed with solvent and fully dissolved into varnishes and then added to an impregnation tank. A fiberglass fabric (e.g., 2116 or 1080 E-glass fiber fabric) was immersed into the impregnation tank to adhere the resin composition on the fiberglass fabric, followed by heating at 120° C. to 170° C. to the semi-cured state (B-Stage) to obtain the prepreg.

Test samples or specimens were prepared as follows.

1. Copper-Clad Laminate (Obtained by Laminating Five Prepregs)

Two 18 μm reverse treated copper foils (RTFs) and five prepregs made from each resin composition (using 2116 E-glass fiber fabrics) were prepared. Each prepreg has a resin content of about 55%. A copper foil, five prepregs and a copper foil were superimposed in such order and then subject to a vacuum condition for lamination at 200° C. for 2.5 hours to form each copper-clad laminate. Insulation layers were formed by curing (C-stage) five sheets of superimposed prepreg between the two copper foils, and the resin content of the insulation layers is about 55%.

2. Copper-Free Laminate (Obtained by Laminating Five Prepregs)

Each copper-clad laminate was etched to remove the two copper foils to obtain a copper-free laminate made from laminating five prepregs and having a resin content of about 55%.

3. Copper-Free Laminate (Obtained by Laminating Two Prepregs)

Two 18 μm reverse treated copper foils (RTFs) and two prepregs made from each resin composition (using 1080 E-glass fiber fabrics) were prepared. Each prepreg has a resin content of about 70%. A copper foil, two prepregs and a copper foil were superimposed in such order and then subject to a vacuum condition for lamination at 205° C. for 2 hours to form each copper-clad laminate. Next, each copper-clad laminate was etched to remove the two copper foils to obtain a copper-free laminate made from laminating two prepregs and having a resin content of about 70%.

Test items and test methods are described below.

1. Volatile Content

Three prepregs obtained from 2116 E-glass fiber fabrics impregnated with each Example or Comparative Example were prepared and cut into a size of 4*4 square inch by reference to IPC-TM-650 2.3.19 and placed into an oven set at 163° C. for baking for 15 minutes, and the weight loss percentage before and after baking was recorded (in wt %).

2. Glass Transition Temperature (Tg)

The copper-free laminate (obtained by laminating five prepregs) was subject to glass transition temperature measurement. Each specimen (i.e., copper-free laminate) was heated from 35° C. to 300° C. at a heating rate of 10° C./minute by a thermomechanical analyzer (TMA) and then subject to the measurement of glass transition temperature (° C.) by reference to the method described in IPC-TM-650 2.4.24.5, wherein higher glass transition temperature is more preferred.

3. Ratio of Thermal Expansion (or Ratio of Dimensional Change, Z-Axis)

The copper-free laminate (obtained by laminating five prepregs) was subject to thermal mechanical analysis (TMA) during the ratio of thermal expansion measurement. Each specimen was heated from 35° C. to 300° C. at a heating rate of 10° C./minute and then subject to the measurement of ratio of thermal expansion (%) in Z-axis by reference to the method described in IPC-TM-650 2.4.24.5, wherein lower ratio of thermal expansion is more preferred and a value of greater than or equal to 0.1% represents significant difference.

4. Thermal Resistance after Moisture Absorption (Pressure Cooking Test, PCT)

The copper-free laminate (obtained by laminating five prepregs) was subject to pressure cooking test (PCT) by reference to IPC-TM-650 2.6.16.1 and 5 hours of moisture absorption (test temperature 121° C., relative humidity 100%), and then by reference to IPC-TM-650 2.4.23, the copper-free laminate after moisture absorption was immersed into a 288° C. solder bath for 20 seconds, removed and inspected for the presence of delamination; delamination represents fail (designated as "X") and no delamination represents pass (designated as "0"). Three specimens were test each round. Designation with one "X" represents that delamination occurs in one specimen, designation with two "X" represents that delamination occurs in two specimens, and designation with three "X" represents that delamination occurs in all three specimens. Interlayer separation between insulation layers is considered as delamination. Interlayer separation refers to blistering or separation between any layers of the laminate.

5. Dielectric Constant (Dk) and Dissipation Factor (Df)

The copper-free laminate (obtained by laminating two prepregs) was subject to dielectric constant and dissipation factor measurement. Each specimen was measured by using a microwave dielectrometer (available from AET Corp.) by reference to JIS C2565 at room temperature (about 25° C.) and under 10 GHz frequency. Lower dielectric constant and lower dissipation factor represent better dielectric properties of the specimen. Under a 10 GHz frequency, for a Dk value of less than or equal to 3.50 and a Df value of less than or equal to 0.004, a difference in Dk value of greater than 0.01 represents substantial difference in dielectric constant in different laminates, a difference in Dk value of less than 0.01 represents no substantial difference in dielectric constant in different laminates, a Df value of less than 0.0001 represents no substantial difference in dissipation factor in different laminates, and a difference in Df value of greater than 0.0001 represents a significant difference (i.e., significant technical difficulty) in dissipation factor in different laminates.

6. Laminate Appearance after Lamination

Figure 6:
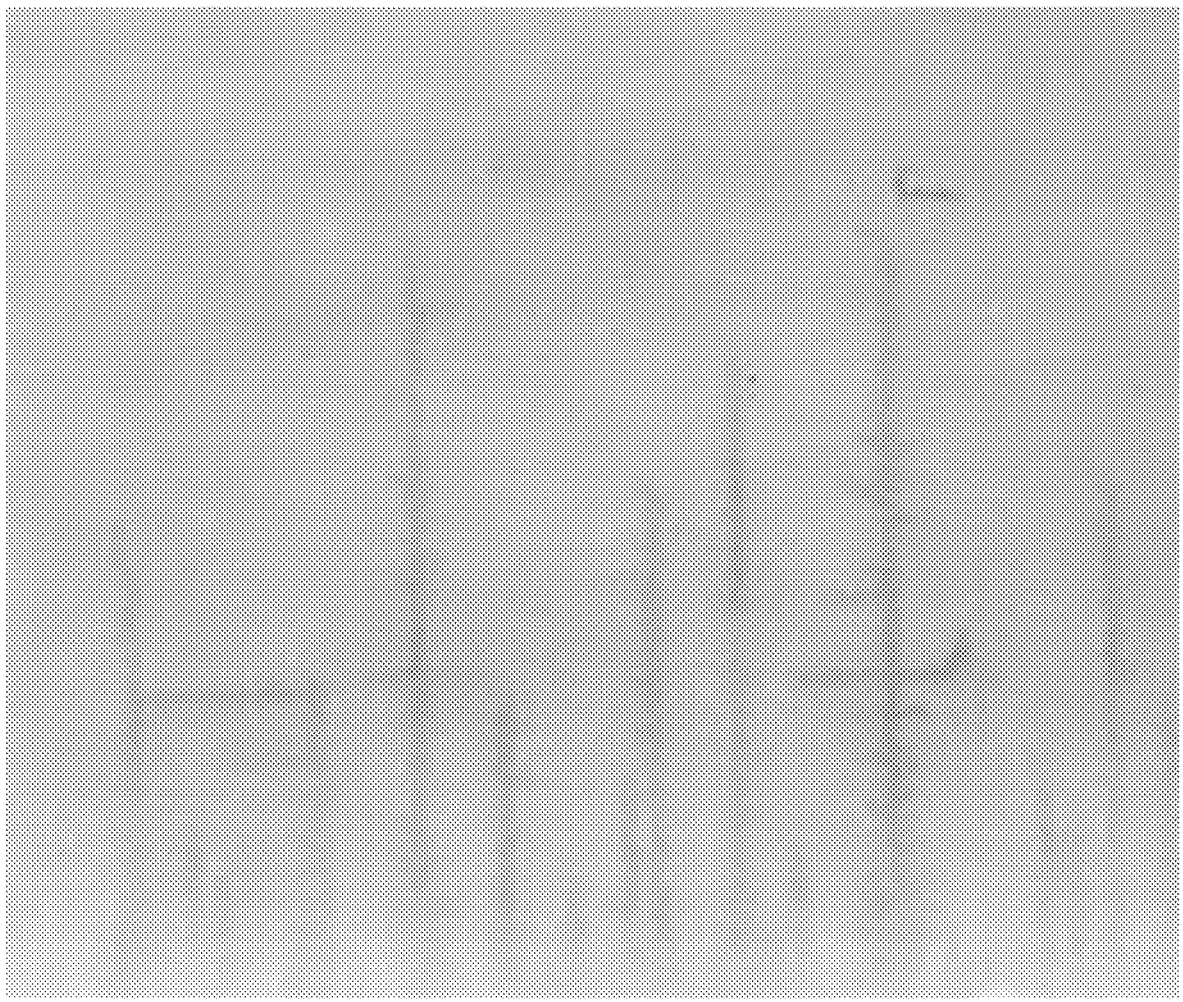
FIG. 6 shows a copper-free laminate with branch-like pattern.
Figure 7:
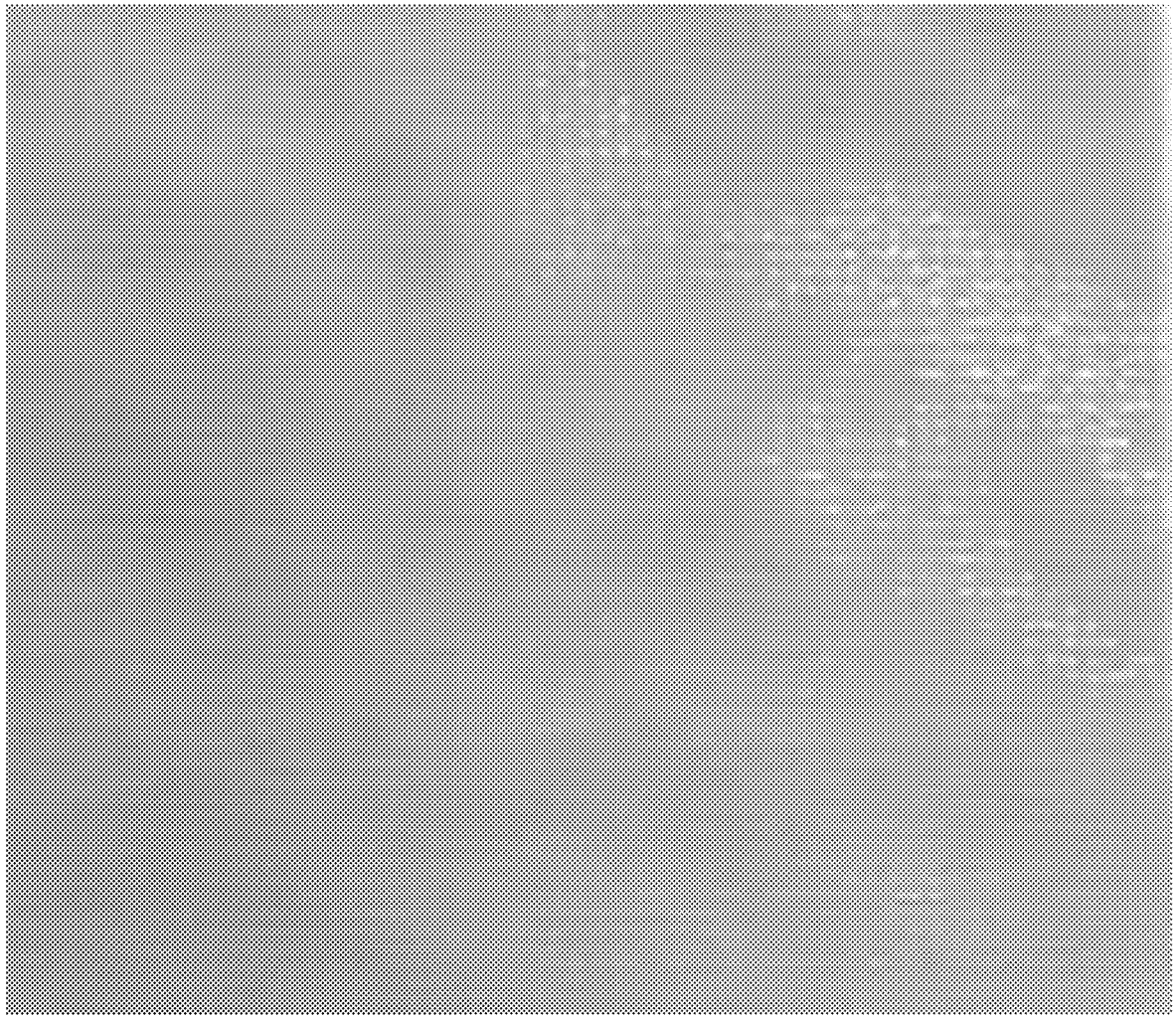
FIG. 7 shows a copper-free laminate with dry board.
Figure 8:
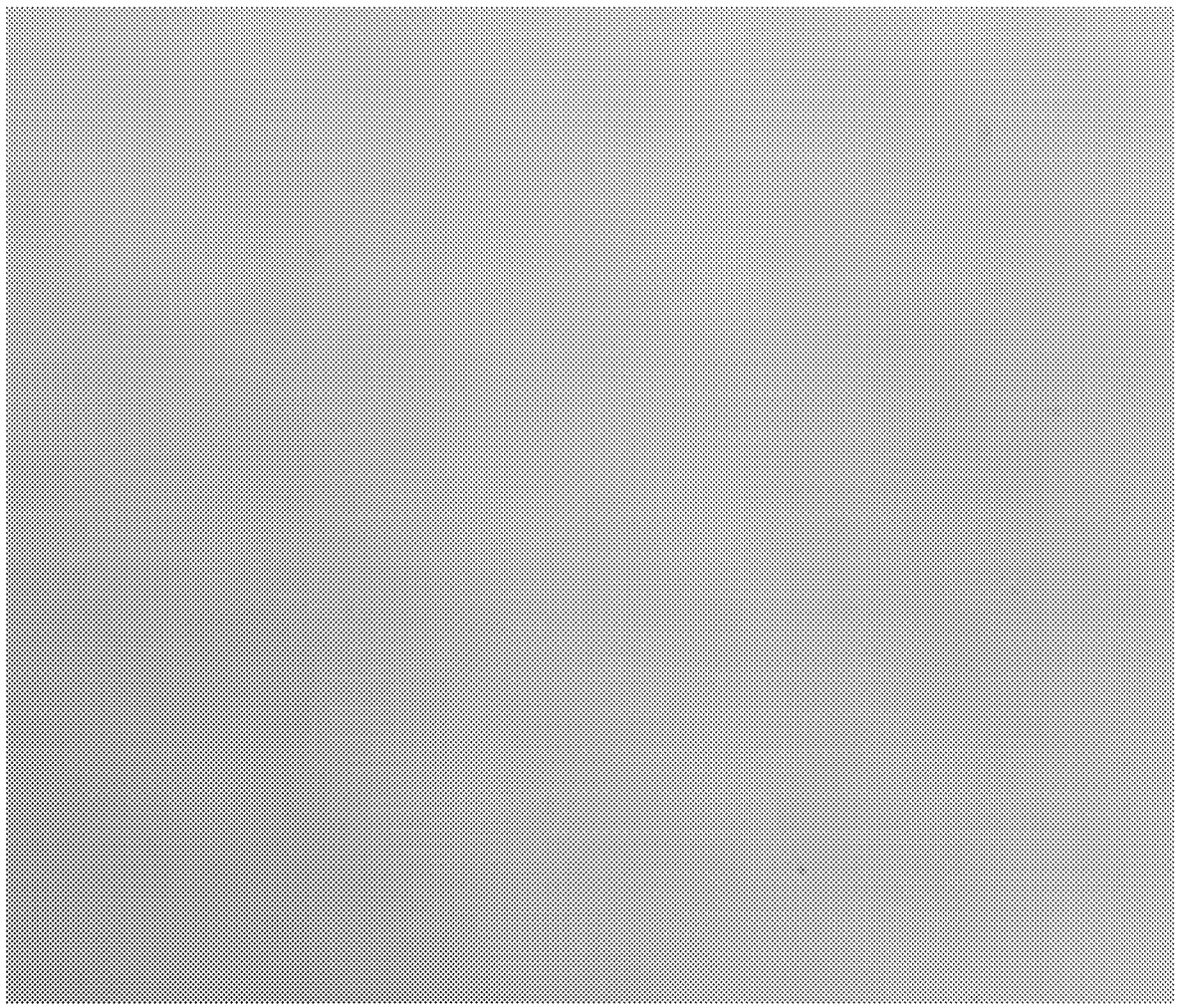
FIG. 8 shows a copper-free laminate without branch-like pattern and without dry board.

During the preparation of the copper-clad laminate (obtained by laminating five prepregs), a copper foil, five prepregs and a copper foil were superimposed in such order and then subject to a vacuum condition for lamination at 205° C. for 2 hours to form each copper-clad laminate, which was then subject to an etching process to remove the copper foils on both sides to obtain the copper-free laminate. The surface of the insulation layer of the copper-free laminate was examined with naked eyes to determine whether branch-like pattern was formed at the edge, which represents poor compatibility of ingredients in the resin composition or high flowability variation that causes inhomogeneity. Presence of branch-like pattern will cause several drawbacks including inconsistent properties (poor reliability) of printed circuit boards made therefrom and significantly lowered yield, such as poor dielectric properties, poor thermal resistance, inconsistent thermal expansion or poor interlayer adhesion. Branch-like pattern is illustrated in FIG. 6. If branch-like pattern was observed, a ruler or an optical microscope was used to measure its length (mm); if branch-like pattern was not observed, a designation "ND" (non-detected) was given. In addition, the appearance of dry board represents that the resin composition has poor impregnation property or poor flowability that causes inhomogeneity. Presence of dry board will also cause inconsistent properties of printed circuit boards made therefrom and significantly lowered yield. Dry board is illustrated in FIG. 7. An acceptable copper-free laminate without branch-like pattern and without dry board is illustrated in FIG. 8.

7. Copper Foil Peeling Strength (P/S)

The copper-clad laminate (obtained by laminating five prepregs) was cut into a rectangular sample with a width of 24 mm and a length of greater than 60 mm, which was etched to remove surface copper foil to leave a rectangular copper foil with a width of 3.18 mm and a length of greater than 60 mm, and tested by using a tensile strength tester by reference to IPC-TM-650 2.4.8 at room temperature (about 25° C.) to measure the force (lb/in) required to pull away the copper foil from the insulation layer. Under a 10 GHz frequency, for a copper-clad laminate with a Df value of less than or equal to 0.004, a difference in peeling strength of greater than 0.1 lb/in represents a significant difference.

Results of Examples and Comparative Examples are listed in Table 5 to Table 6 below.

TABLE 5

Test results of resin compositions of Examples

| Item | E1 | E2 | E3 | E4 | E5 | E6 | E7 | E8 |
|---|---|---|---|---|---|---|---|---|
| Volatile content | 2.2 | 2.5 | 2.0 | 2.9 | 2.8 | 1.9 | 2.3 | 2.4 |
| Tg | 210 | 220 | 206 | 208 | 201 | 223 | 209 | 217 |
| Ratio of thermal expansion | 1.61 | 1.49 | 1.65 | 1.69 | 1.75 | 1.37 | 1.70 | 1.58 |
| PCT | ○○○ | ○○○ | ○○○ | ○○○ | ○○○ | ○○○ | ○○○ | ○○○ |
| Dk | 3.47 | 3.48 | 3.48 | 3.41 | 3.41 | 3.50 | 3.48 | 3.48 |
| Df | 0.0039 | 0.0039 | 0.0039 | 0.0038 | 0.0038 | 0.0040 | 0.0040 | 0.0040 |
| Laminate appearance | ND | ND | ND | ND | ND | ND | ND | ND |
| P/S | 4.3 | 4.5 | 4.5 | 4.0 | 4.1 | 4.6 | 4.4 | 4.6 |

| Item | E9 | E10 | E11 | E12 | E13 | E14 | E15 |
|---|---|---|---|---|---|---|---|
| Volatile content | 2.5 | 2.4 | 1.9 | 2.7 | 2.8 | 1.9 | 2.0 |
| Tg | 219 | 216 | 215 | 203 | 200 | 223 | 214 |
| Ratio of thermal expansion | 1.57 | 1.59 | 1.75 | 1.70 | 1.75 | 1.52 | 1.57 |
| PCT | ○○○ | ○○○ | ○○○ | ○○○ | ○○○ | ○○○ | ○○○ |
| Dk | 3.49 | 3.48 | 3.50 | 3.47 | 3.40 | 3.50 | 3.47 |

TABLE 5-continued

Test results of resin compositions of Examples

| | | | | | | | |
|---|---|---|---|---|---|---|---|
| Df | 0.0040 | 0.0040 | 0.0040 | 0.0040 | 0.0038 | 0.0040 | 0.0039 |
| Laminate appearance | ND | ND | ND | ND | ND | * | ND |
| P/S | 4.4 | 4.5 | 4.2 | 4.3 | 3.2 | 4.5 | 4.4 |

*: with dry board, without branch like pattern

TABLE 6

Test results of resin compositions of Comparative Examples

| Item | C1 | C2 | C3 | C4 | C5 | C6 |
|---|---|---|---|---|---|---|
| Volatile content | 3.5 | 4.0 | 1.9 | 5.2 | 4.9 | 3.3 |
| Tg | 193 | 202 | 205 | 199 | 192 | 208 |
| Ratio of thermal expansion | 1.83 | 1.72 | 1.70 | 1.81 | 1.88 | 1.70 |
| PCT | ○○○ | ○XX | ○○○ | XXX | XXX | ○○X |
| Dk | 3.59 | 3.58 | 3.61 | 3.55 | 3.55 | 3.61 |
| Df | 0.0043 | 0.0042 | 0.0044 | 0.0042 | 0.0042 | 0.0044 |
| Laminate appearance | Branch-like pattern 10-40 mm | ND | ND | ND | ND | ND |
| P/S | 4.7 | 4.5 | 4.6 | 4.2 | 4.2 | 4.3 |

| Item | C7 | C8 | C9 | C10 |
|---|---|---|---|---|
| Volatile content | 3.9 | 3.8 | 3.8 | 3.5 |
| Tg | 200 | 203 | 205 | 189 |
| Ratio of thermal expansion | 1.77 | 1.76 | 1.72 | 1.93 |
| PCT | ○XX | ○XX | ○XX | ○○X |
| Dk | 3.58 | 3.54 | 3.58 | 3.59 |
| Df | 0.0043 | 0.0043 | 0.0043 | 0.0043 |
| Laminate appearance | ND | ND | ND | Branch-like pattern 20-40 mm |
| P/S | 4.3 | 4.1 | 4.4 | 4.2 |

The following observations can be made from the results in Table 5 and Table 6.

Compared with C2, C4 and C5 (not containing prepolymerized resin), E3, E4 and E5 (containing prepolymerized resin) have lower volatile content, higher glass transition temperature, lower ratio of thermal expansion, no delamination after moisture absorption in thermal resistance test, and better (lower) dielectric constant and dissipation factor, indicating that E3, E4 and E5 (containing prepolymerized resin), compared with C2, C4 and C5 (not containing prepolymerized resin), have better thermal resistance, better dimensional stability, better thermal resistance after moisture absorption and better dielectric properties.

E1, E2 and E3 (prepolymerized resin of unsaturated bond-containing polyphenylene oxide and t-butyl styrene), compared with C1 (prepolymerized resin of unsaturated bond-containing polyphenylene oxide and TAIC), have higher glass transition temperature, lower volatile content, lower ratio of thermal expansion, and better (lower) dielectric constant and dissipation factor, indicating that selecting unsaturated bond-containing polyphenylene oxide and t-butyl styrene to proceed the prepolymerization reaction will provide a prepolymer with better thermal resistance, better dimensional stability and better dielectric properties and without branch-like pattern at laminate edges.

Compared with C7, C8 and C9 (not containing prepolymerized resin), E7 and E8 (containing prepolymerized resin), both containing a prepolymerized resin formed by prepolymerizing different kinds of unsaturated bond-containing polyphenylene oxide and t-butyl styrene, have lower volatile content, higher glass transition temperature, no delamination after moisture absorption in thermal resistance test, and better (lower) dielectric constant and dissipation factor, indicating that E7 and E8, compared with C7, C8 and C9, have better thermal resistance, better thermal resistance after moisture absorption and better dielectric properties.

Compared with C8 and C9 (not containing prepolymerized resin), E9 and E10, both involving a resin composition containing a prepolymerized resin formed by prepolymerizing unsaturated bond-containing polyphenylene oxide and t-butyl styrene with the addition of a vinyl-containing polyphenylene oxide, have lower volatile content, higher glass transition temperature, lower ratio of thermal expansion, no delamination after moisture absorption in thermal resistance test, and better (lower) dielectric constant and dissipation factor, indicating that a resin composition of the prepolymerized resin with the addition of a vinyl-containing polyphenylene oxide may still achieve better thermal resistance, better dimensional stability, better thermal resistance after moisture absorption and better dielectric properties.

The above detailed description is merely illustrative in nature and is not intended to limit the embodiments of the subject matter or the application and uses of such embodiments. As used herein, the term "exemplary" or similar expression means "serving as an example, instance, or illustration." Any implementation described herein as exemplary is not necessarily to be construed as preferred or advantageous over other implementations, unless otherwise specified.

Moreover, while at least one exemplary example or comparative example has been presented in the foregoing detailed description, it should be appreciated that a vast number of variations exist. It should also be appreciated that the exemplary one or more embodiments described herein are not intended to limit the scope, applicability, or configuration of the claimed subject matter in any way. Rather, the foregoing detailed description will provide those skilled in the art with a convenient guide for implementing the described one or more embodiments and equivalents thereof. Also, the scope defined by the claims includes known equivalents and foreseeable equivalents at the time of filing this patent application.

What is claimed is:

1. A prepolymerized resin prepared from a prepolymerization reaction of a composition, the composition at least comprising: (1) t-butyl styrene; and (2) unsaturated bond-containing polyphenylene oxide, wherein the prepolymerized resin contains a reactive vinyl group.

2. The prepolymerized resin of claim 1, wherein the t-butyl styrene comprises o-t-butyl styrene, m-t-butyl styrene, p-t-butyl styrene or a combination thereof.

3. The prepolymerized resin of claim 1, wherein the unsaturated bond-containing polyphenylene oxide has a structure as shown below:

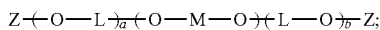

wherein a and b are individually a positive integer of 1 to 30;

—(O-M-O)— represents:

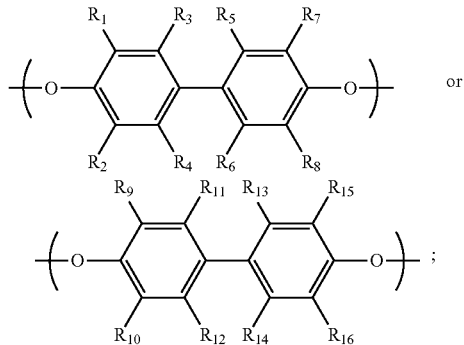

L represents:

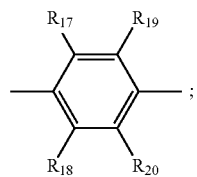

wherein $R_1$, $R_2$, $R_7$ and $R_8$ are the same or different and are individually a halogen atom, a C1-C6 alkyl group or a phenyl group;

$R_3$, $R_4$, $R_5$ and $R_6$ are the same or different and are individually a hydrogen atom, a halogen atom, a C1-C6 alkyl group or a phenyl group;

$R_9$, $R_{10}$, $R_{11}$, $R_{12}$, $R_{13}$, $R_{14}$, $R_{15}$ and $R_{16}$ are the same or different and are individually a halogen atom, a C1-C6 alkyl group, a phenyl group or a hydrogen atom;

A is a C1-C20 straight chain hydrocarbylene group, a C1-C20 branched chain hydrocarbylene group or a C3-C20 cyclic hydrocarbylene group;

$R_{17}$, $R_{18}$, $R_{19}$ and $R_{20}$ are the same or different and are individually a hydrogen atom, a halogen atom, a C1-C6 alkyl group or a phenyl group;

Z has a structure as shown below:

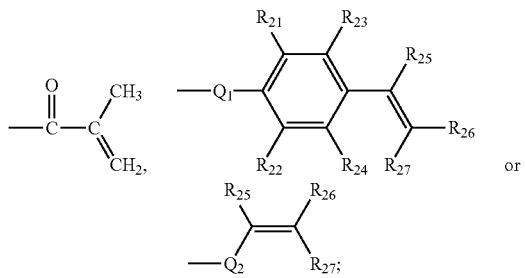

wherein $R_{26}$ and $R_{27}$ are both a hydrogen atom, $R_{21}$, $R_{22}$, $R_{23}$, $R_{24}$ and $R_{25}$ are the same or different and are individually a hydrogen atom, a halogen atom, an alkyl group or a haloalkyl group; $Q_1$ and $Q_2$ are individually an organic group with at least one carbon atom, wherein the organic group optionally comprises one or more of a hydrogen atom, an oxygen atom, a nitrogen atom, a sulfur atom and a halogen atom.

4. The prepolymerized resin of claim 1, wherein the unsaturated bond-containing polyphenylene oxide comprises: methacrylate-terminated polyphenylene oxide, vinylbenzyl-terminated polyphenylene oxide, vinylbenzyl-modified bisphenol A polyphenylene oxide resin, vinyl-containing chain-extended polyphenylene oxide resin or a combination thereof.

5. The prepolymerized resin of claim 1, wherein the composition further comprises a vinyl-containing compound which comprises one or more carbon-carbon double bonds per molecule.

6. The prepolymerized resin of claim 5, wherein the vinyl-containing compound comprises: maleimide resin and/or a modification thereof, polyolefin and/or a modification thereof, acrylate and/or a modification thereof, styrene and/or a modification thereof, divinylbenzene and/or a modification thereof, bis(vinylbenzyl)ether and/or a modification thereof, bis(vinylphenyl)ethane and/or a modification thereof, triallyl isocyanurate and/or a modification thereof, triallyl cyanurate and/or a modification thereof, 1,2,4-trivinyl cyclohexane and/or a modification thereof or a combination thereof.

7. The prepolymerized resin of claim 1, which is prepared from the prepolymerization reaction of the composition in the presence of an initiator.

8. The prepolymerized resin of claim 7, wherein the initiator comprises: benzoyl peroxide, dicumyl peroxide, 2,5-dimethyl-2,5-di(t-butylperoxy)hexane, 2,5-dimethyl-2,5-di(t-butylperoxy)-3-hexyne, di-t-butyl peroxide, di(t-butylperoxyisopropyl)benzene, di(t-butylperoxy)phthalate, t-butyl peroxybenzoate, 2,2-di(t-butylperoxy)butane, 2,2-di(t-butylperoxy)octane, 2,5-dimethyl-2, 5-di(benzoylperoxy)hexane, 2,3-bis(trimethylsiloxyperoxy)-2,3-diphenylbutane or a combination thereof.

9. The prepolymerized resin of claim 1, which is prepared from the prepolymerization reaction of the composition in the presence of a molecular weight regulator.

10. The prepolymerized resin of claim 9, wherein the molecular weight regulator comprises: n-butyl mercaptan, dodecyl mercaptan, mercaptoacetic acid, mercaptopropanoic acid, mercaptoethanol, 2,4-diphenyl-4-methyl-1-pentene, 4,4'-butylidenebis(6-t-butyl-3-methylphenol), 2,2'-methylenebis(4-ethyl-6-t-butylphenol) or a combination thereof.

11. The prepolymerized resin of claim 1, which has a weight-average molecular weight of between 1,000 and 20,000.

12. A method of preparing the prepolymerized resin of claim 1, comprising subjecting a composition to a prepolymerization reaction, the composition at least comprising: (1) t-butyl styrene; and (2) unsaturated bond-containing polyphenylene oxide.

13. The method of claim 12, wherein the composition further comprises a vinyl-containing compound which comprises one or more carbon-carbon double bonds per molecule.

14. The method of claim 13, wherein the vinyl-containing compound comprises: maleimide resin and/or a modification thereof, polyolefin and/or a modification thereof, acrylate and/or a modification thereof, styrene and/or a modification thereof, divinylbenzene and/or a modification thereof, bis(vinylbenzyl)ether and/or a modification thereof, bis(vinylphenyl)ethane and/or a modification thereof, triallyl isocyanurate and/or a modification thereof, triallyl cyanurate and/or a modification thereof, 1,2,4-trivinyl cyclohexane and/or a modification thereof or a combination thereof.

15. The method of claim 12, wherein the composition is subjected to the prepolymerization reaction in the presence of an initiator and/or a molecular weight regulator.

16. The method of claim 15, wherein the initiator comprises: benzoyl peroxide, dicumyl peroxide, 2,5-dimethyl-2,5-di(t-butylperoxy)hexane, 2,5-dimethyl-2,5-di(t-butylperoxy)-3-hexyne, di-t-butyl peroxide, di(t-butylperoxyisopropyl)benzene, di(t-butylperoxy)phthalate, t-butyl peroxybenzoate, 2,2-di(t-butylperoxy)butane, 2,2-di(t-butylperoxy)octane, 2,5-dimethyl-2,5-di(benzoylperoxy)hexane, 2,3-bis(trimethylsiloxyperoxy)-2,3-diphenylbutane or a combination thereof.

17. The method of claim 15, wherein the molecular weight regulator comprises: n-butyl mercaptan, dodecyl mercaptan, mercaptoacetic acid, mercaptopropanoic acid, mercaptoethanol, 2,4-diphenyl-4-methyl-1-pentene, 4,4'-butylidenebis(6-t-butyl-3-methylphenol), 2,2'-methylenebis(4-ethyl-6-t-butylphenol) or a combination thereof.

18. The method of claim 12, wherein a conversion rate of the t-butyl styrene is between 30% and 99%.

19. A resin composition comprising the prepolymerized resin of claim 1 and an additive.

20. The resin composition of claim 19, comprising 1 to 300 parts by weight of the additive relative to 100 parts by weight of the prepolymerized resin.

21. The resin composition of claim 19, wherein the additive comprises: polyphenylene oxide and/or a modification thereof, cyanate ester and/or a modification thereof, maleimide resin and/or a modification thereof, polyolefin and/or a modification thereof, acrylate and/or a modification thereof, styrene and/or a modification thereof, divinylbenzene and/or a modification thereof, bis(vinylbenzyl)ether and/or a modification thereof, bis(vinylphenyl)ethane and/or a modification thereof, triallyl isocyanurate and/or a modification thereof, triallyl cyanurate and/or a modification thereof, 1,2,4-trivinyl cyclohexane and/or a modification thereof or a combination thereof.

22. The resin composition of claim 19, further comprising: epoxy resin and/or a modification thereof, phenolic resin and/or a modification thereof, benzoxazine resin and/or a modification thereof, maleic anhydride and/or a modification thereof, acrylic acid and/or a modification thereof, polyester and/or a modification thereof, amine curing agent and/or a modification thereof, diallyl bisphenol A and/or a modification thereof, polyamide and/or a modification thereof, polyimide and/or a modification thereof or a combination thereof.

23. The resin composition of claim 19, further comprising flame retardant, inorganic filler, curing accelerator, solvent, toughening agent, silane coupling agent or a combination thereof.

24. An article made from the resin composition of claim 19, comprising a resin film, a prepreg, a laminate or a printed circuit board.

25. The article of claim 24, having at least one of the following properties:
a glass transition temperature as measured by reference to IPC-TM-650 2.4.24.5 of greater than or equal to 200° C.;
as measured by reference to JIS C2565, a dissipation factor of less than or equal to 0.004 and a dielectric constant of less than or equal to 3.5;
a peel strength as measured by reference to IPC-TM-650 2.4.8 of greater than or equal to 3.0 lb/in;
a Z-axis ratio of thermal expansion as measured by reference to IPC-TM-650 2.4.24.5 of less than or equal to 1.75%; and
no delamination occurs after moisture absorption of 5 hours as measured by reference to IPC-TM-650 2.6.16.1 and then by reference to IPC-TM-650 2.4.23.

* * * * *